United States Patent
Elbsat et al.

(10) Patent No.: US 12,002,121 B2
(45) Date of Patent: Jun. 4, 2024

(54) THERMAL ENERGY PRODUCTION, STORAGE, AND CONTROL SYSTEM WITH HEAT RECOVERY CHILLERS

(71) Applicant: Johnson Controls Tyco IP Holdings LLP, Milwaukee, WI (US)

(72) Inventors: Mohammad N. Elbsat, Milwaukee, WI (US); Michael J. Wenzel, Grafton, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 89 days.

(21) Appl. No.: 17/582,988

(22) Filed: Jan. 24, 2022

(65) Prior Publication Data
US 2022/0148102 A1    May 12, 2022

Related U.S. Application Data

(63) Continuation of application No. 16/518,314, filed on Jul. 22, 2019, now Pat. No. 11,238,547, which is a (Continued)

(51) Int. Cl.
*G05B 13/02* (2006.01)
*G06Q 30/0283* (2023.01)
*G06Q 50/06* (2012.01)

(52) U.S. Cl.
CPC .......... *G06Q 50/06* (2013.01); *G05B 13/026* (2013.01); *G06Q 30/0284* (2013.01); *Y04S 10/50* (2013.01)

(58) Field of Classification Search
None
See application file for complete search history.

(56) References Cited

U.S. PATENT DOCUMENTS

| 5,216,612 A | 6/1993 | Cornett et al. |
| 5,630,070 A | 5/1997 | Dietrich et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Afram, A. et al., "Artificial Neural Network (ANN) Based Model Predictive Control (MPC) and Optimization of HVAC Systems: A State of the Art Review and Case Study of a Residential HVAC System", Energy and Buildings, Apr. 15, 2017, 141, pp. 96-113.

(Continued)

*Primary Examiner* — Jason Lin
(74) *Attorney, Agent, or Firm* — Foley & Lardner LLP

(57) ABSTRACT

A thermal energy production and control system includes a heat recovery chiller, thermal energy storage, and a controller. The controller uses thermal energy load targets to generate control decisions for the heat recovery chiller and the thermal energy storage for a plurality of time steps of a time period. The control decisions include a first amount of hot thermal energy or cold thermal energy to be generated by the heat recovery chiller at a first time step of the time period and stored in the thermal energy storage and a second amount of the hot thermal energy or the cold thermal energy to be discharged from the thermal energy storage and used to satisfy one or more of the thermal energy load targets for a second time step of the time period. The controller operates the heat recovery chiller and the thermal energy storage in accordance with the control decisions.

20 Claims, 13 Drawing Sheets

Related U.S. Application Data continuation-in-part of application No. 15/426,962, filed on Feb. 7, 2017, now Pat. No. 10,359,748, and a continuation-in-part of application No. 15/616,616, filed on Jun. 7, 2017, now Pat. No. 10,949,777, and a continuation-in-part of application No. 16/115,290, filed on Aug. 28, 2018, said application No. 16/518,314 is a continuation-in-part of application No. 16/352,485, filed on Mar. 13, 2019, now Pat. No. 10,909,642, which is a continuation of application No. 15/405,236, filed on Jan. 12, 2017, now Pat. No. 10,282,796, said application No. 16/518,314 is a continuation-in-part of application No. 16/383,228, filed on Apr. 12, 2019, now Pat. No. 11,036,249, which is a continuation of application No. 15/405,234, filed on Jan. 12, 2017, now Pat. No. 10,324,483.

(60) Provisional application No. 62/558,135, filed on Sep. 13, 2017.

(56) References Cited

U.S. PATENT DOCUMENTS

| | | | |
|---|---|---|---|
| 7,062,361 | B1 | 6/2006 | Lane |
| 7,124,059 | B2 | 10/2006 | Wetzer et al. |
| 7,457,762 | B2 | 11/2008 | Wetzer et al. |
| 7,464,046 | B2 | 12/2008 | Wilson et al. |
| 7,580,775 | B2* | 8/2009 | Kulyk .............. H02J 13/00034 700/295 |
| 7,693,735 | B2 | 4/2010 | Carmi et al. |
| 7,894,946 | B2 | 2/2011 | Kulyk et al. |
| 8,014,892 | B2 | 9/2011 | Glasser |
| 8,126,574 | B2 | 2/2012 | Discenzo et al. |
| 8,155,900 | B1* | 4/2012 | Adams .............. F24F 11/46 702/62 |
| 8,170,893 | B1 | 5/2012 | Rossi |
| 8,396,571 | B2 | 3/2013 | Costiner et al. |
| 8,527,108 | B2* | 9/2013 | Kulyk .............. G06Q 10/04 307/38 |
| 8,527,109 | B2 | 9/2013 | Kulyk et al. |
| 8,880,962 | B2 | 11/2014 | Hosking et al. |
| 8,903,554 | B2 | 12/2014 | Stagner |
| 8,918,223 | B2 | 12/2014 | Kulyk et al. |
| 9,058,568 | B2 | 6/2015 | Hosking et al. |
| 9,058,569 | B2 | 6/2015 | Hosking et al. |
| 9,110,647 | B2 | 8/2015 | Kulyk et al. |
| 9,185,176 | B2 | 11/2015 | Nielsen et al. |
| 9,235,847 | B2 | 1/2016 | Greene et al. |
| 9,424,693 | B2 | 8/2016 | Rodrigues |
| 9,429,923 | B2 | 8/2016 | Ward et al. |
| 9,447,985 | B2 | 9/2016 | Johnson |
| 9,514,577 | B2 | 12/2016 | Ahn et al. |
| 9,703,339 | B2 | 7/2017 | Kulyk et al. |
| 9,740,545 | B2 | 8/2017 | Aisu et al. |
| 9,760,068 | B2 | 9/2017 | Harkonen et al. |
| 10,101,731 | B2 | 10/2018 | Asmus et al. |
| 10,139,877 | B2 | 11/2018 | Kulyk et al. |
| 10,190,793 | B2 | 1/2019 | Drees et al. |
| 10,250,039 | B2 | 4/2019 | Wenzel et al. |
| 10,359,748 | B2 | 7/2019 | Elbsat et al. |
| 10,437,241 | B2 | 10/2019 | Higgins et al. |
| 10,438,303 | B2 | 10/2019 | Chen et al. |
| 10,591,875 | B2 | 3/2020 | Shanmugam et al. |
| 10,719,789 | B1* | 7/2020 | Hoff .............. G01K 17/20 |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2002/0072988 | A1 | 6/2002 | Aram |
| 2002/0198629 | A1 | 12/2002 | Ellis |
| 2003/0055798 | A1 | 3/2003 | Hittle et al. |
| 2003/0158803 | A1 | 8/2003 | Darken et al. |
| 2004/0049295 | A1 | 3/2004 | Wojsznis et al. |
| 2004/0054564 | A1 | 3/2004 | Fonseca et al. |
| 2005/0091004 | A1 | 4/2005 | Parlos et al. |
| 2007/0005191 | A1 | 1/2007 | Sloup et al. |
| 2007/0084502 | A1* | 4/2007 | Kelly .............. F24S 50/20 136/246 |
| 2007/0203860 | A1 | 8/2007 | Golden et al. |
| 2009/0204267 | A1 | 8/2009 | Sustaeta et al. |
| 2009/0240381 | A1 | 9/2009 | Lane |
| 2009/0313083 | A1 | 12/2009 | Dillon et al. |
| 2009/0319090 | A1 | 12/2009 | Dillon et al. |
| 2010/0198420 | A1* | 8/2010 | Rettger .............. H02S 10/00 706/46 |
| 2010/0241285 | A1 | 9/2010 | Johnson et al. |
| 2011/0009996 | A1 | 1/2011 | Liu et al. |
| 2011/0018502 | A1* | 1/2011 | Bianciotto ........ H02J 7/007182 320/162 |
| 2011/0093310 | A1 | 4/2011 | Watanabe et al. |
| 2011/0178643 | A1 | 7/2011 | Metcalfe |
| 2011/0218691 | A1 | 9/2011 | O'Callaghan et al. |
| 2011/0231028 | A1 | 9/2011 | Ozog |
| 2011/0231320 | A1 | 9/2011 | Irving |
| 2012/0016607 | A1 | 1/2012 | Cottrell et al. |
| 2012/0036250 | A1 | 2/2012 | Vaswani et al. |
| 2012/0047891 | A1* | 3/2012 | Rosenfeld .............. F25B 40/00 60/659 |
| 2012/0092180 | A1 | 4/2012 | Rikkola et al. |
| 2012/0130556 | A1* | 5/2012 | Marhoefer .............. G05B 15/02 700/291 |
| 2012/0158350 | A1* | 6/2012 | Steinberg .............. F24F 11/47 702/130 |
| 2012/0245968 | A1 | 9/2012 | Beaulieu et al. |
| 2012/0296482 | A1 | 11/2012 | Steven et al. |
| 2012/0310860 | A1 | 12/2012 | Kim et al. |
| 2012/0316906 | A1 | 12/2012 | Hampapur et al. |
| 2012/0330626 | A1* | 12/2012 | An .............. G01K 17/20 703/2 |
| 2013/0006429 | A1 | 1/2013 | Shanmugam et al. |
| 2013/0010348 | A1 | 1/2013 | Massard et al. |
| 2013/0020443 | A1 | 1/2013 | Dyckrup et al. |
| 2013/0103481 | A1 | 4/2013 | Carpenter et al. |
| 2013/0113413 | A1 | 5/2013 | Harty |
| 2013/0204443 | A1 | 8/2013 | Steven et al. |
| 2013/0274937 | A1 | 10/2013 | Ahn et al. |
| 2013/0339080 | A1 | 12/2013 | Beaulieu et al. |
| 2014/0012427 | A1 | 1/2014 | Katayama et al. |
| 2014/0039709 | A1 | 2/2014 | Steven et al. |
| 2014/0067151 | A1 | 3/2014 | Erhart et al. |
| 2014/0163936 | A1 | 6/2014 | Hosking et al. |
| 2014/0201018 | A1 | 7/2014 | Chassin |
| 2014/0244051 | A1 | 8/2014 | Rollins et al. |
| 2014/0249680 | A1 | 9/2014 | Wenzel |
| 2014/0257526 | A1 | 9/2014 | Tiwari et al. |
| 2014/0277769 | A1 | 9/2014 | Matsuoka et al. |
| 2014/0316973 | A1 | 10/2014 | Steven et al. |
| 2015/0008884 | A1 | 1/2015 | Waki et al. |
| 2015/0088576 | A1 | 3/2015 | Steven et al. |
| 2015/0134123 | A1 | 5/2015 | Obinelo |
| 2015/0309495 | A1 | 10/2015 | Delorme et al. |
| 2015/0311713 | A1 | 10/2015 | Asghari et al. |
| 2015/0316902 | A1 | 11/2015 | Wenzel et al. |
| 2015/0316903 | A1 | 11/2015 | Asmus et al. |
| 2015/0316907 | A1 | 11/2015 | Elbsat et al. |
| 2015/0316946 | A1* | 11/2015 | Wenzel .............. G06Q 10/04 700/291 |
| 2015/0326015 | A1 | 11/2015 | Steven et al. |
| 2015/0371328 | A1 | 12/2015 | Gabel et al. |
| 2016/0020608 | A1 | 1/2016 | Carrasco et al. |
| 2016/0043550 | A1 | 2/2016 | Sharma et al. |
| 2016/0077880 | A1 | 3/2016 | Santos et al. |
| 2016/0092986 | A1 | 3/2016 | Lian et al. |
| 2016/0148137 | A1 | 5/2016 | Phan et al. |
| 2016/0148171 | A1* | 5/2016 | Phan .............. G01M 99/008 702/184 |
| 2016/0187911 | A1* | 6/2016 | Carty .............. G05B 15/02 700/276 |
| 2016/0195866 | A1 | 7/2016 | Turney et al. |
| 2016/0209852 | A1 | 7/2016 | Beyhaghi et al. |
| 2016/0216722 | A1 | 7/2016 | Tokunaga et al. |

(56) References Cited

U.S. PATENT DOCUMENTS

| | | |
|---|---|---|
| 2016/0232549 A1 | 8/2016 | Guenette et al. |
| 2016/0246908 A1 | 8/2016 | Komzsik |
| 2016/0275630 A1 | 9/2016 | Strelec et al. |
| 2016/0281607 A1* | 9/2016 | Asati .................. F02C 7/26 |
| 2016/0305678 A1 | 10/2016 | Pavlovski et al. |
| 2016/0329708 A1 | 11/2016 | Day |
| 2016/0363948 A1 | 12/2016 | Steven et al. |
| 2016/0373453 A1 | 12/2016 | Ruffner et al. |
| 2016/0377306 A1* | 12/2016 | Drees .................. H02J 3/28 700/295 |
| 2016/0379149 A1 | 12/2016 | Saito et al. |
| 2017/0003667 A1 | 1/2017 | Nakabayashi et al. |
| 2017/0083822 A1 | 3/2017 | Adendorff et al. |
| 2017/0097647 A1 | 4/2017 | Lunani et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Ref |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0167742 A1 | 6/2017 | Radovanovic et al. |
| 2017/0169143 A1 | 6/2017 | Farahat et al. |
| 2017/0205818 A1 | 7/2017 | Adendorff et al. |
| 2017/0236222 A1 | 8/2017 | Chen et al. |
| 2017/0288455 A1 | 10/2017 | Fife |
| 2017/0309094 A1 | 10/2017 | Farahat et al. |
| 2017/0351234 A1 | 12/2017 | Chen et al. |
| 2017/0366414 A1 | 12/2017 | Hamilton et al. |
| 2018/0046149 A1 | 2/2018 | Ahmed |
| 2018/0082373 A1 | 3/2018 | Hong et al. |
| 2018/0173214 A1 | 6/2018 | Higgins et al. |
| 2018/0196456 A1 | 7/2018 | Elbsat |
| 2018/0197253 A1 | 7/2018 | Elbsat et al. |
| 2018/0203961 A1* | 7/2018 | Aisu .................. G06F 30/20 |
| 2018/0219374 A1 | 8/2018 | Pavlak et al. |
| 2018/0224814 A1 | 8/2018 | Elbsat et al. |
| 2018/0341255 A1 | 11/2018 | Turney et al. |
| 2018/0373234 A1 | 12/2018 | Khalate et al. |
| 2019/0066236 A1 | 2/2019 | Wenzel |
| 2019/0072943 A1* | 3/2019 | Przybylski ........... G06Q 50/06 |
| 2019/0093556 A1* | 3/2019 | Wagner .............. F02C 1/05 |
| 2019/0129403 A1 | 5/2019 | Turney et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0338972 A1 | 11/2019 | Schuster et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0347622 A1 | 11/2019 | Elbsat et al. |
| 2019/0354071 A1 | 11/2019 | Turney et al. |
| 2020/0014209 A1 | 1/2020 | Chazottes |
| 2020/0019129 A1 | 1/2020 | Sircar et al. |
| 2020/0090289 A1 | 3/2020 | Elbsat et al. |
| 2020/0096985 A1 | 3/2020 | Wenzel et al. |
| 2020/0284458 A1 | 9/2020 | Yoshida et al. |
| 2020/0301408 A1 | 9/2020 | Elbsat et al. |

FOREIGN PATENT DOCUMENTS

| | | |
|---|---|---|
| CN | 1256465 A | 6/2000 |
| CN | 102034143 A | 4/2011 |
| CN | 102132223 A | 7/2011 |
| CN | 102315672 A | 1/2012 |
| CN | 102376026 A | 3/2012 |
| CN | 102856930 A | 1/2013 |
| CN | 203216986 U | 9/2013 |
| CN | 103679357 A | 3/2014 |
| CN | 104113140 A | 10/2014 |
| CN | 104156581 A | 11/2014 |
| CN | 104220945 A | 12/2014 |
| CN | 104298191 A | 1/2015 |
| CN | 105005872 A | 10/2015 |
| CN | 105741018 A | 7/2016 |
| CN | 105844367 A | 8/2016 |
| CN | 105958549 A | 9/2016 |
| CN | 106066077 A | 11/2016 |
| CN | 106169108 A | 11/2016 |
| CN | 106503842 A | 3/2017 |
| CN | 106529769 A | 3/2017 |
| EP | 1 156 286 A2 | 11/2001 |
| EP | 3 088 972 A2 | 11/2016 |
| EP | 3 186 687 A4 | 7/2017 |
| EP | 3 447 258 A1 | 2/2019 |
| EP | 3 497 377 A1 | 6/2019 |
| JP | 2001-357112 A | 12/2001 |
| JP | 2003-141178 A | 5/2003 |
| JP | 2013-222293 A | 10/2013 |
| JP | 2014-217091 A | 11/2014 |
| JP | 2015-099417 A | 5/2015 |
| JP | 2015-177623 A | 10/2015 |
| WO | WO-2011/080547 A1 | 7/2011 |
| WO | WO-2012/145563 A1 | 10/2012 |
| WO | WO-2012/161804 A1 | 11/2012 |
| WO | WO-2013/130956 A1 | 9/2013 |
| WO | WO-2014/143908 A1 | 9/2014 |
| WO | WO-2015/031581 A1 | 3/2015 |
| WO | WO-2016/144586 A1 | 9/2016 |
| WO | WO-2018/217251 A1 | 11/2018 |

OTHER PUBLICATIONS

Astrom, K., "Optimal Control of Markov Decision Processes with Incomplete State Estimation," J. Math. Anal. Appl., 1965, 10, pp. 174-205.

Aynur, T., "Variable refrigerant flow systems: A review", Energy and Buildings, 2010, 42.7, pp. 1106-1112.

Bana E Costa, C. et al., "A multi-criteria model for auditing a Predictive Maintenance Programme", European Journal of Operational Research, Sep. 29, 2011, 217.2, pp. 381-393.

Bittanti, S. et al., Adaptive Control of Linear Time Invariant Systems: The "Bet on the Best" Principle, Communications in Information and Systems, 2006, 6.4, pp. 299-320.

Chan, V. et al., "Estimation of Degradation-Based Reliability in Outdoor Environments", Statistics Preprints, Jun. 19, 2001, 25, 33 pages.

Chen et al., "Control-oriented System Identification: an H1 Approach," Wiley-Interscience, 2000, 19, Chapters 3 & 8, 38 pages.

Chu, C. et al., "Predictive maintenance: The one-unit replacement model", International Journal of Production Economics, 1998, 54.3, pp. 285-295.

Chua, K. et al., "Achieving better energy-efficient air conditioning-a review of technologies and strategies", Applied Energy, 2013, 104, pp. 87-104.

CN Office Action on CN App. Ser. No. 201810106712.X. dated Aug. 5, 2021 (16 pages).

CN Office Action on CN Appl. Ser. No. 201811043606.8 dated Jul. 2, 2021 (10 pages).

Crowder, S. et al., "The Use of Degradation Measures to Design Reliability Test Plans", World Academy of Science, Engineering and Technology, International Journal of Mathematical, Computational, Physical, Electrical and Computer Engineering, 2014, 8, 18 pages.

De Carlo, F. et al., "Maintenance Cost Optimization in Condition Based Maintenance: A Case Study for Critical Facilities", International Journal of Engineering and Technology, Oct.-Nov. 2013, 5.5, pp. 4296-4302.

Doring, Matthias, "Prediction vs Forecasting: Predictions do not always concern the future . . . ," Data Science Blog, URL:

(56) References Cited

OTHER PUBLICATIONS https://www.datascienceblog.net/post/machine-learning/forecasting_vs_prediction/, 3 pages, Dec. 9, 2018, 3 pages.
Ebbers, M. et al., "Smarter Data Centers—Achieving Great Efficiency—Second Edition", Oct. 21, 2011, 138 pages.
Emmerich, S. et al., "State-of-the-Art Review of CO2 Demand Controlled Ventilation Technology and Application", NISTIR, Mar. 2001, 47 pages.
EP Office Action on EP Appl. Ser. No. 18150740.1 dated Nov. 5, 2019 (6 pages).
EP Office Action on EP Appl. Ser. No. 18176474.7 dated Feb. 10, 2020 (6 pages).
EP Office Action on EP Appl. Ser. No. 18176474.7 dated Sep. 11, 2019 (5 pages).
EP Office Action on EP Appl. Ser. No. 18190786.6 dated Feb. 5, 2020 (4 pages).
EP Office Action on EP Appl. Ser. No. 18190786.6 dated Sep. 23, 2020 (4 pages).
Feng, J. et al., "Model Predictive Control of Radiant Slab Systems with Evaporative Cooling Sources," Energy and Buildings, 2015, 87, pp. 199-210.
Fu, C. et al., "Predictive Maintenance in Intelligent-Control-Maintenance-Management System for Hydroelectric Generating Unit", IEEE Transactions on Energy Conversion, Mar. 2004, 19.1, pp. 179-186.
Fuller, S., "Life-Cycle Cost Analysis (LCCA) I", WBDG—Whole Building Design Guide, National Institute of Standards and Technology (NIST), https://www.wbdg.org/resources/life-cycle-cost-analysis-lcca, 2016, pp. 1-13.
Gedam, S., "Optimizing R&M Performance of a System Using Monte Carlo Simulation", 2012 Proceedings Annual Reliability and Maintainability Symposium, 2012, pp. 1-6.
George et al., "Time Series Analysis: Forecasting and Control", Fifth Edition, John Wiley & Sons, 2016, Chapters 4-7 and 13-15, 183 pages.
Grall, A et al., "Continuous-Time Predictive-Maintenance Scheduling for a Deteriorating System", IEEE Transactions on Reliability, Jun. 2002, 51.2, pp. 141-150.
Hagmark, P. et al., "Simulation and Calculation of Reliability Performance and Maintenance Costs", 2007 Annual Reliability and Maintainability Symposium, IEEE Xplore, 2007, pp. 34-40.
Hardt, M et al., "Gradient Descent Learns Linear Dynamical Systems", Journal of Machine Learning Research, 2018, 19, pp. 1-44.
Helmicki, A. et al. "Control Oriented System Identification: a Worst-case/deterministic Approach in H1," IEEE Transactions on Automatic Control, 1991, 36.10, pp. 1163-1176.
Hong, T. et al. "Development and Validation of a New Variable Refrigerant Flow System Model in Energyplus", Energy and Buildings, 2016, 117, pp. 399-411.
Hong, Y. et al., "Statistical Methods for Degradation Data With Dynamic Covariates Information and an Application to Outdoor Weathering Data", Technometrics, Nov. 2014, 57.2, pp. 180-193.
International Search Report and Written Opinion on Appl. Ser. No. PCT/US2018/018039 dated Apr. 24, 2018 (14 pages).
International Search Report and Written Opinion on Appl. Ser. No. PCT/US2020/042916 dated Oct. 8, 2020 (14 pages).
International Search Report and Written Opinion on Appl. Ser. No. PCT/US2020/045238 dated Oct. 26, 2020 (14 pages).
JP2003141178 WIPO Translation, Accessed Feb. 18, 2020, 15 pages.
Kelman, A. et al., "Bilinear Model Predictive Control of a HVAC System Using Sequential Quadratic Programming", Proceedings of the IFAC World Congress, Sep. 2, 2011, 6 pages.
Kharoufeh, J. et al., "Semi-Markov Models for Degradation-Based Reliability", IIE Transactions, May 2010, 42.8, pp. 599-612.
Kingma, D. et al., "Adam: A Method for Stochastic Optimization", International Conference on Learning Representations (ICLR), 2015, 15 pages.
Lazic, N. et al., "Data center cooling using model-predictive control", 32nd Conference on Neural Information Processing Systems, 2018, 10 pages.
Li, H. et al., "Reliability Modeling and Life Estimation Using an Expectation Maximization Based Wiener Degradation Model for Momentum Wheels", IEEE Transactions on Cybernetics, May 2015, 45.5, pp. 969-977.
Ljung (ed.), "System Identification: Theory for the User", 2nd Edition, Prentice Hall, Upper Saddle River, New Jersey, 1999, Chapters 5 and 7, 40 pages.
Ljung et al., "Theory and Practice of Recursive Identification," vol. 5. JSTOR, 1983, Chapters 2, 3 & 7, 80 pages.
Ma, Y. et al., "Model Predictive Control for the Operation of Building Cooling Systems", IEEE Transactions on Control Systems Technology, May 2012, 20:3, pp. 796-803.
Ma, Y. et al., "Predictive Control for Energy Efficient Buildings with Thermal Storage: Modeling, Stimulation, and Experiments", IEEE Control Systems, Feb. 2012, 32.1, pp. 44-64.
Mohsenian-Rad, H. et al., "Smart Grid for Smart city Activities in the California City of Riverside," In: Alberto Leon-Garcia et al.: "Smart City 360°", Aug. 6, 2016, 22 Pages.
Moseley, P. et al., "Electrochemical Energy Storage for Renewable Sources and Grid Balancing", Nov. 7, 2014, 14 pages.
Pan, Z. et al., "Reliability modeling of degradation of products with multiple performance characteristics based on gamma processes", Reliability Engineering & System Safety, 2011, 96.8, pp. 949-957.
Peng, W. et al., "Bayesian Degradation Analysis with Inverse Gaussian Process Models Under Time-Varying Degradation Rates", IEEE Transactions on Reliability, Mar. 2017, 66.1, pp. 84-96.
Peng, W. et al., "Bivariate Analysis of Incomplete Degradation Observations Based on Inverse Gaussian Processes and Copulas", IEEE Transactions on Reliability, Jun. 2016, 65.2, pp. 624-639.
Peng, Y. et al., "Switching State-Space Degradation Model with Recursive Filter/Smoother for Prognostics of Remaining Useful Life", IEEE Transactions on Industrial Informatics, Feb. 2019, 15.2, pp. 822-832.
Perez-Lombard, L. et al., "A review on buildings energy consumption information", Energy and Buildings, 2008, 40.3, pp. 394-398.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Rahman, A. et al., "Cost Estimation for Maintenance Contracts for Complex Asset/Equipment", 2008 IEEE International Conference on Industrial Engineering and Engineering Management, 2008, pp. 1355-1358.
Ruijters, E. et al., "Fault Maintenance Trees: Reliability Centered Maintenance via Statistical Model Checking", 2016 Annual Reliability and Maintainability Symposium (RAMS), Jan. 25-28, 2016, pp. 1-6.
Wan, F. et al., "Data Analysis and Reliability Estimation of Step-Down Stress Accelerated Degradation Test Based on Wiener Process", Prognostics and System Health Management Conference (PHM-2014 Hunan), Aug. 2014, 5 pages.
Wang, et al., "Research on Economic Demand Response Model in PJM Electric Market Considering the Error Uncertainty of CBL," Electric Power Construction, Oct. 2016, vol. 37, No. 10, 7 pages.
Wang, P. et al., "Reliability and Degradation Modeling with Random or Uncertain Failure Threshold", Reliability and Maintainability Symposium, 2007, pp. 392-397.
Ward, J. et al., "Beyond Comfort—Managing the Impact of HVAC Control on the Outside World", Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.
Weigel, D. et al., "Applying GIS and OR Techniques to Solve Sears Technician-Dispatching and Home Delivery Problems," Interface, Jan.-Feb. 1999, 29:1, pp. 112-130.
Xiao, X. et al., "Optimal Design for Destructive Degradation Tests with Random Initial Degradation Values Using the Wiener Process", IEEE Transactions on Reliability, Sep. 2016, 65.3, pp. 1327-1342.

(56) References Cited

OTHER PUBLICATIONS

Xu, Z. et al., "Real-time Reliability Prediction for a Dynamic System Based on the Hidden Degradation Process Identification", IEEE Transactions on Reliability, Jun. 2008, 57.2, pp. 230-242.

Yang, L. et al., "Thermal comfort and building energy consumption implications—a review", Applied Energy, 2014, 115, pp. 164-173.

Zhang, R. et al., "A Novel Variable Refrigerant Flow (VRF) Heat Recovery System Model: Development and Validation", Energy and Buildings, Jun. 2018, 168, pp. 399-412.

Zhang, Y. et al., "Analysis of Destructive Degradation Tests for a Product with Random Degradation Initiation Time", IEEE Transactions on Reliability, Mar. 2015, 64.1, pp. 516-527.

Zhang, Z., et al., "An Age-and-State-Dependent Nonlinear Prognostic Model for Degrading Systems", IEEE Transactions on Reliability, Dec. 2015, 64.4, pp. 1214-1228.

Zhou, X. et al., "Reliability-centered predictive maintenance scheduling for a continuously monitored system subject to degradation", Reliability Engineering & System Safety, 2007, 92.4, pp. 530-534.

Zhou, Y. et al., "Asset Life Prediction Using Multiple Degradation Indicators and Lifetime Data: a Gamma-Based State Space Model Approach", 2009 8th International Conference on Reliability, Maintainability and Safety, Aug. 2009, 5 pages.

JP Office Action on JP Appl. Ser. No. 2018-167590 dated Jul. 5, 2022, with translation (9 pages).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

(56) References Cited

OTHER PUBLICATIONS

CN Office Action other on CN Appl. Ser. No. 201811043606.8 dated Mar. 8, 2022 with translation (8 pages).
EP Office Action on EP Appl. Ser. No. 18190786.6 dated Feb. 1, 2022 (4 pages).
International Preliminary Report on Patentability on PCT Appl. Ser. No. PCT/US2020/042916 dated Feb. 3, 2022 (8 pages).
Jakhrani et al., "Life Cycle Cost Analysis of a Standalone PV system," IEEE, 2012 International Conference in Green and Ubiquitous Technology (pp. 82-85).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "Hvac system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

\* cited by examiner

THERMAL ENERGY PRODUCTION, STORAGE, AND CONTROL SYSTEM WITH HEAT RECOVERY CHILLERS

CROSS-REFERENCE TO RELATED PATENT APPLICATIONS

This application is a continuation of U.S. patent application Ser. No. 16/518,314 filed Jul. 22, 2019, which is a continuation-in-part of U.S. patent application Ser. No. 15/426,962, filed Feb. 7, 2017 (now U.S. Pat. No. 10,359, 748). U.S. patent application Ser. No. 16/518,314 is also a continuation-in-part of U.S. patent application Ser. No. 16/115,290, filed Aug. 28, 2018, which claims the benefit of and priority to U.S. Provisional Patent Application 62/558, 135, filed Sep. 13, 2017. U.S. patent application Ser. No. 16/518,314 is also a continuation-in-part of U.S. patent application Ser. No. 16/352,485, filed Mar. 13, 2019 (now U.S. Pat. No. 10,909,642), which is a continuation of U.S. patent application Ser. No. 15/405,236, filed Jan. 12, 2017 (now U.S. Pat. No. 10,282,796). U.S. patent application Ser. No. 16/518,314 is also a continuation-in-part of U.S. patent application Ser. No. 16/383,228, filed Apr. 12, 2019 (now U.S. Pat. No. 11,036,249), which is a continuation of U.S. patent application Ser. No. 15/405,234, filed Jan. 12, 2017 (now U.S. Pat. No. 10,324,483). U.S. patent application Ser. No. 16/518,314 is also a continuation-in-part of U.S. patent application Ser. No. 15/616,616, filed Jun. 7, 2017 (now U.S. Pat. No. 10,949,777). The above-referenced patent applications are incorporated by reference herein in their entireties.

BACKGROUND

The present disclosure relates generally to an energy cost optimization system for a building, a collection of buildings, or a central plant. The present disclosure relates more particularly to an energy cost optimization system that determines optimal asset sizes for various assets in the building, collection of buildings, or the central plant, as well as energy load setpoints for the assets.

Assets in a building or central plant can include individual pieces of equipment or groups of equipment. For example, assets can include boilers, chillers, heat recovery chillers, steam generators, electrical generators, thermal energy storage tanks, batteries, air handling units, or other types of equipment in a building or a central plant. Assets can include collections of equipment which form a subplant of a central plant. For example, assets can include a heater subplant, a chiller subplant, a heat recovery chiller subplant, a steam subplant, and/or an electricity subplant. Some buildings or central plants include assets such as thermal energy storage (e.g., one or more cold thermal energy storage tanks) or electrical energy storage (e.g., one or more batteries).

When purchasing an asset, a decision needs to be made regarding the best size of the asset for a given application. Asset purchase decisions are traditionally informed by various guidelines or rough approximations based on intended use. However, these guidelines and approximations are rarely optimal and can result in an asset purchase that is either insufficient or excessive for the given application. It can be difficult to determine the optimal sizes of assets in a building or central plant.

SUMMARY

One implementation of the present disclosure is an energy cost optimization system for a building or campus. The system includes equipment operable to satisfy an energy load of the building or campus and a controller. The controller is configured to obtain a cost function defining a cost of operating the equipment over a time period as a function of one or more energy load setpoints for the equipment. The cost function includes a revenue term defining revenue to be obtained by operating the equipment to participate in an incentive program over the time period. The controller is also configured to modify the cost function to account for both an initial purchase cost of a new asset to be added to the equipment and an effect of the new asset on the cost of operating the equipment. Both the initial purchase cost of the new asset and the effect of the new asset on the cost of operating the equipment are functions of one or more asset size variables. The controller is also configured to perform an optimization of the modified cost function to determine values for the energy load setpoints, the asset size variables, and participation in the incentive program over the time period, and automatically initiate a process to acquire and install the new asset having an asset size based on the values of the asset size variables resulting from the optimization of the modified cost function.

In some embodiments, the revenue term includes one or more of a demand response term or a frequency regulation term. In some embodiments, the cost function includes an equipment degradation term defining a cost of degradation of the equipment. In some embodiments, the cost function includes a maintenance cost term defining a cost of maintaining the equipment.

In some embodiments, the cost function includes a peak load contribution term that defines a cost of purchasing an energy resource from a utility provider during peak load subperiods. The controller is configured modify the peak load contribution term by applying a peak subperiods vector to the peak load contribution term. The peak hours vector includes a prediction of which peak subperiods in the time period will be peak hours.

In some embodiments, the controller is configured to perform the optimization of the modified cost function to determine values for the energy load setpoints following a stochastic optimization process. In some embodiments, the stochastic optimization process includes obtaining representative loads and rates for the building or campus for each of a plurality of scenarios and performing a first optimization to determine a peak demand target. The peak demand target minimizes a risk attribute of the cost function over the plurality of the scenarios. The method may include performing a second optimization subject to a constraint defined by the peak demand target to determine values for the energy load setpoints, the asset size variables, and participation in the incentive program over the time period.

Another implementation of the present disclosure is a method. The method includes obtaining a cost function defining a cost operating building equipment over a time period as a function of one or more energy load setpoints for the equipment. The cost function includes a revenue term defining revenue to be obtained by operating the equipment to participate in an incentive program over the time period. The method includes modifying the cost function to account for both an initial purchase cost of a new asset to be added to the equipment and an effect of the new asset on the cost of operating the equipment, where both the initial purchase cost of the new asset and the effect of the new asset on the cost of operating the equipment are functions of one or more asset size variables. The method includes performing an optimization of the modified cost function to determine values for the energy load setpoints, the asset size variables, and participation in the incentive program over the time period, and initiating acquisition of the new asset having an asset size based on the values of the asset size variables resulting from the optimization of the modified cost function.

In some embodiments, the revenue term includes one or more of a demand response term or a frequency regulation term. In some embodiments, the cost function includes an equipment degradation term defining a cost of degradation of the equipment. In some embodiments, the cost function includes a peak load contribution term defining a cost of purchasing an energy resource from a utility provider during peak load subperiods.

In some embodiments, performing the optimization of the modified cost function includes performing a stochastic optimization process. The stochastic optimization process may include obtaining loads and rates for the building or campus for each of a plurality of scenarios, performing a first optimization to determine a peak demand target which minimizes a risk attribute of the cost function over the plurality of the scenarios, performing a second optimization subject to a constraint defined by the peak demand target to determine values for the energy load setpoints, the asset size variables, and participation in the incentive program over the time period. Performing the stochastic optimization process may include determining values of the asset size variables that minimize the cost function over a plurality of scenarios.

In some embodiments, the method includes automatically scheduling an installation period for the new asset and controlling the building equipment to facilitate installation of the new asset during the installation period.

Another implementation of the present disclosure is one or more non-transitory computer-readable media containing program instructions that, when executed by one or more processors, cause the one or more processors to perform operations. The operations include obtaining a cost function defining a cost operating building equipment over a time period as a function of one or more energy load setpoints for the equipment. The cost function includes a revenue term defining revenue to be obtained by operating the equipment to participate in an incentive program over the time period. The operations include modifying the cost function to account for both an initial purchase cost of a new asset to be added to the equipment and an effect of the new asset on the cost of operating the equipment, where both the initial purchase cost of the new asset and the effect of the new asset on the cost of operating the equipment are functions of one or more asset size variables. The operations include performing an optimization of the modified cost function to determine values for the energy load setpoints, the asset size variables, and participation in the incentive program over the time period, and initiating acquisition of the new asset having an asset size based on the values of the asset size variables resulting from the optimization of the modified cost function.

In some embodiments, the revenue term includes one or more of a demand response term or a frequency regulation term. In some embodiments, the cost function includes one or more of an equipment degradation term defining a cost of degradation of the equipment or a maintenance cost term defining a cost of maintaining the equipment.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
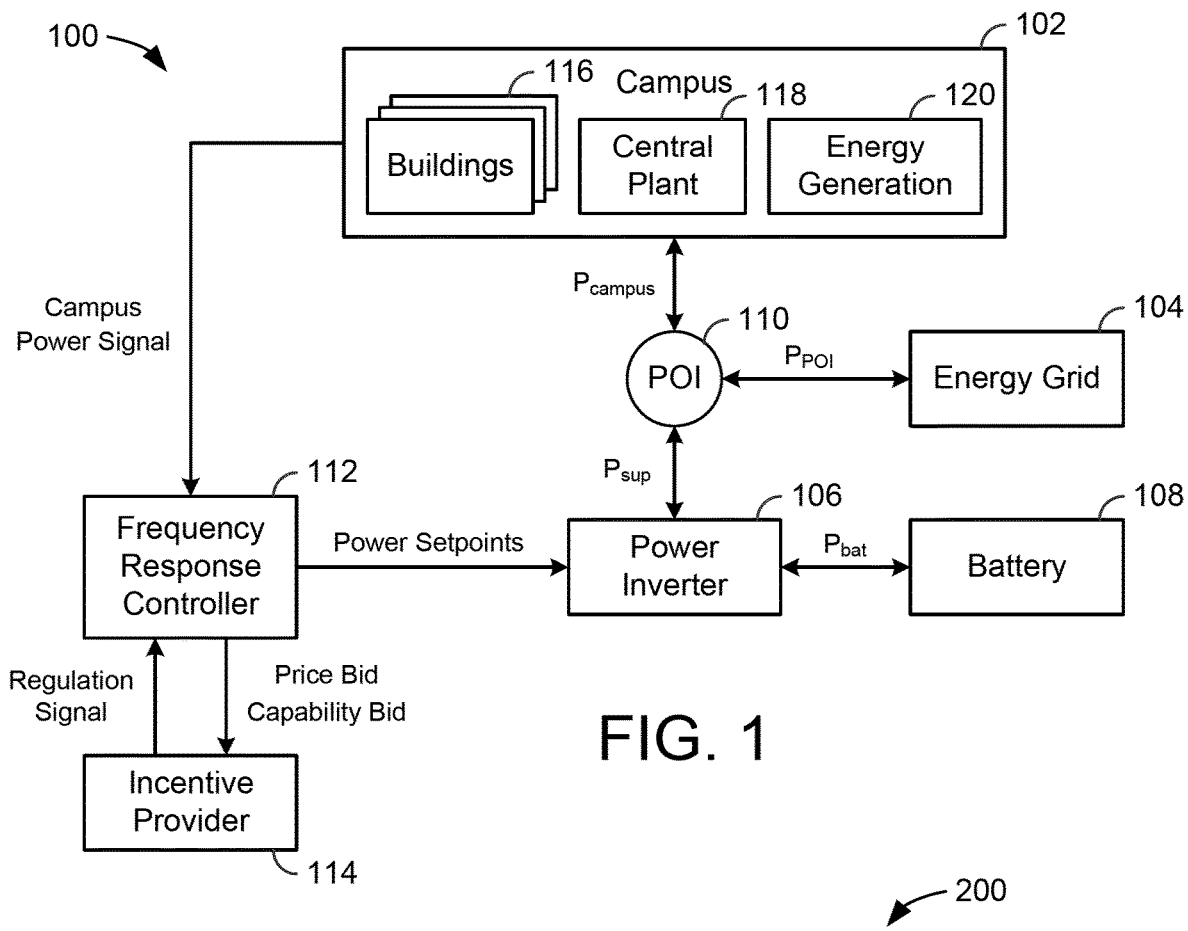
FIG. 1 is a block diagram of a frequency response optimization system, according to an exemplary embodiment.

Referring generally to the FIGURES, a building energy cost optimization system with asset sizing and components thereof are shown according to various exemplary embodiments. The systems and methods described herein can be configured to determine the optimal sizes of various assets in a building, group of buildings, or a central plant. Assets can include individual pieces of equipment (e.g., boilers, chillers, heat recovery chillers, steam generators, electrical generators, thermal energy storage tanks, batteries, etc.), groups of equipment, or entire subplants of a central plant. Asset sizes can include a maximum loading of the asset (e.g., maximum power, maximum charge/discharge rate) and/or a maximum capacity of the asset (e.g., maximum electric energy storage, maximum fluid storage, etc.).

The energy cost optimization system can be configured to determine the optimal size of an asset by considering the potential benefits and costs of the asset. Potential benefits can include, for example, reduced energy costs, reduced demand charges, reduced peak load contribution (PLC) charges, and/or increased revenue from participating in incentive-based demand response (IBDR) programs such as frequency regulation (FR) or economic load demand response (ELDR). Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by an original cost function $J(x)$. For example, the cost function $J(x)$ may include terms corresponding to energy cost, multiple demand charges, PLC charges, and/or IBDR revenue, as previously described. Adding one or more new assets may affect the values of some or all of these terms in the original cost function $J(x)$. For example, adding a battery asset may increase IBDR revenue and decrease energy cost, demand charges, and PLC charges. However, the original cost function $J(x)$ may not account for the fixed and marginal costs resulting from new asset purchases. In order to account for these fixed and marginal costs, asset sizing module 916 may add new terms to the original cost function $J(x)$.

The energy cost optimization system can be configured to augment the cost function $J(x)$ with two new terms that correspond to the cost of purchasing the new assets, resulting in an augmented cost function $J_a(x)$. The additional terms are shown in the following equation:

$$J_a(x) = J(x) + c_f^T v + c_s^T s_a$$

where $J(x)$ is the original cost function, $x$ is the vector of decision variables of the optimization problem over the horizon, $c_f$ is a vector of fixed costs of buying any size of asset (e.g., one element for each potential asset purchase), $v$ is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector $x$. This allows the energy cost optimization system to perform a single optimization to determine optimal values for all of the decision variables in the augmented cost function $J_a(x)$, including the asset sizes.

In some embodiments, the energy cost optimization system scales the asset purchase costs $c_f^T v$ and $c_s^T s_a$ to the duration of the optimization period $h$. The cost of purchasing an asset is typically paid over an entire payback period SPP, whereas the operational cost is only over the optimization period $h$. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}(c_f^T v + c_s^T s_a)$$

where $h$ is the duration of the optimization period in hours, SPP is the duration of the payback period in years, and 8760 is the number of hours in a year.

The energy cost optimization system can perform an optimization process to determine the optimal values of each of the binary decision variables in the vector $v$ and each of the continuous decision variables in the vector $s_a$. In some embodiments, the optimization system uses linear programming (LP) or mixed integer linear programming (MILP) to optimize a financial metric such as net present value (NPV), simple payback period (SPP), or internal rate of return (IRR). Each element of the vectors $c_f$, $v$, $c_s$, and $s_a$ may correspond to a particular asset and/or a particular asset size. Accordingly, the energy cost optimization system can determine the optimal assets to purchase and the optimal sizes to purchase by identifying the optimal values of the binary decision variables in the vector $v$ and the continuous decision variables in the vector $s_a$. These and other features of the energy cost optimization system are described in greater detail below.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat} - P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
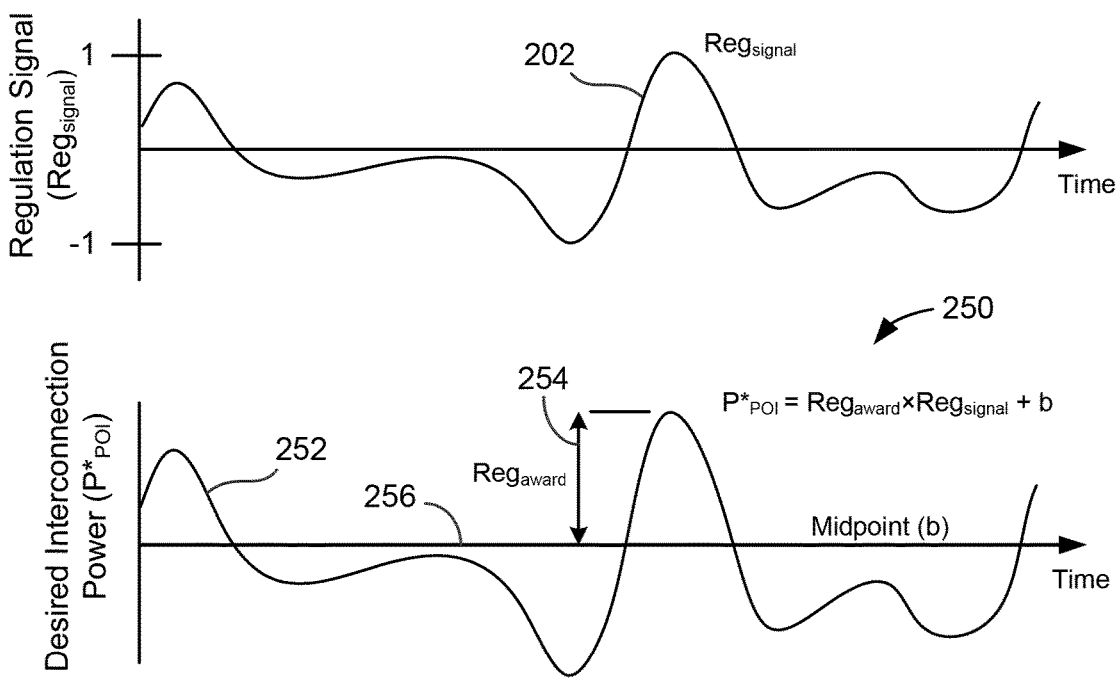
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., −1 ≤ $Reg_{signal}$ ≤ 1). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}$=0.5) may indicate that system 100 is requested to add 5 MW of power at POI 110 relative to midpoint b (e.g., $P_{POI}^*$=10 MW×0.5+b), whereas a regulation signal value of −0.3 may indicate that system 100 is requested to remove 3 MW of power from POI 110 relative to midpoint b (e.g., $P_{POI}^*$=10 MW×−0.3+b).

Graph 250 illustrates the desired interconnection power $P_{POI}^*$ 252 as a function of time. $P_{POI}^*$ 252 may be calculated by frequency response controller 112 based on $Reg_{signal}$ 202, $Reg_{award}$ 254, and a midpoint b 256. For example, controller 112 may calculate $P_{POI}^*$ 252 using the following equation:

$$P_{POI}^* = Reg_{award} \times Reg_{signal} + b$$

where $P_{POI}^*$ represents the desired power at POI 110 (e.g., $P_{POI}^* = P_{sup} + P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^* = Reg_{award} \times Reg_{signal} + b$$

where $P_{POI}^* = P_{sup} + P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P_{POI}^* = Reg_{award} \times Res_{FR} + b$$

where $Res_{FR}$ is an optimal frequency response generated by optimizing a value function. Controller 112 may subtract $P_{campus}$ from $P_{POI}^*$ to generate the power setpoint for power inverter 106 (i.e., $P_{sup} = P_{POI}^* - P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
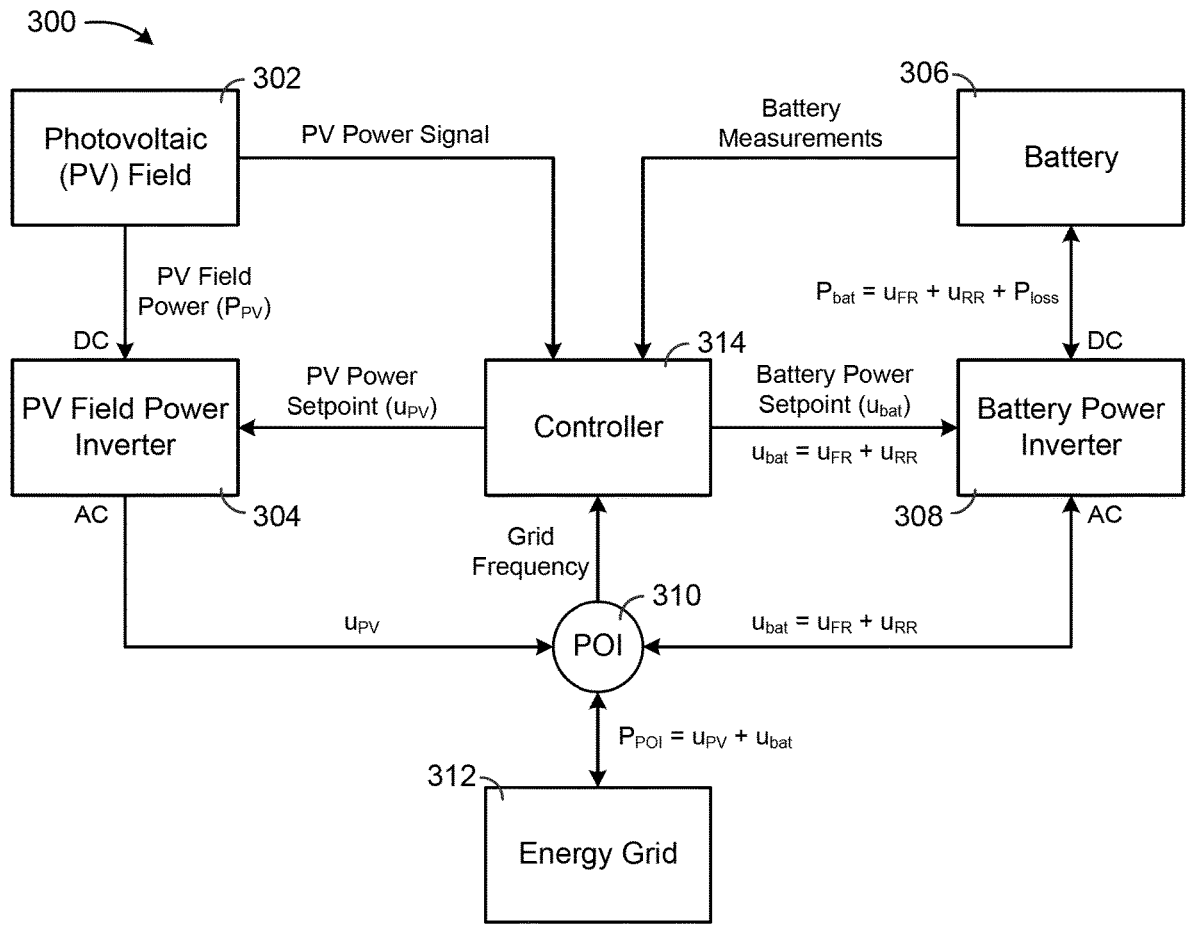
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
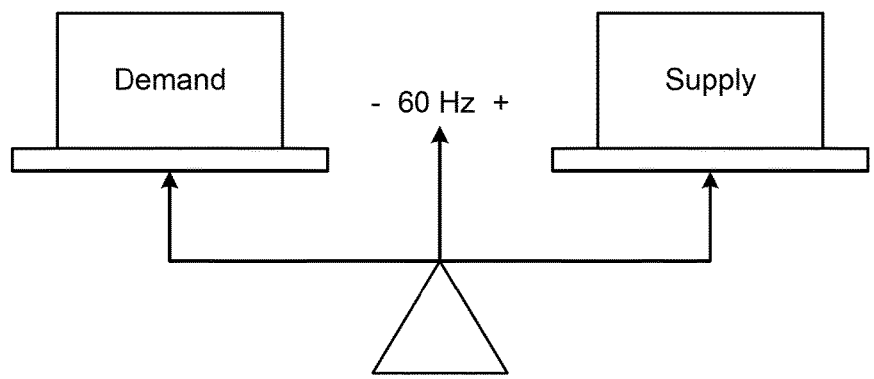
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5A:
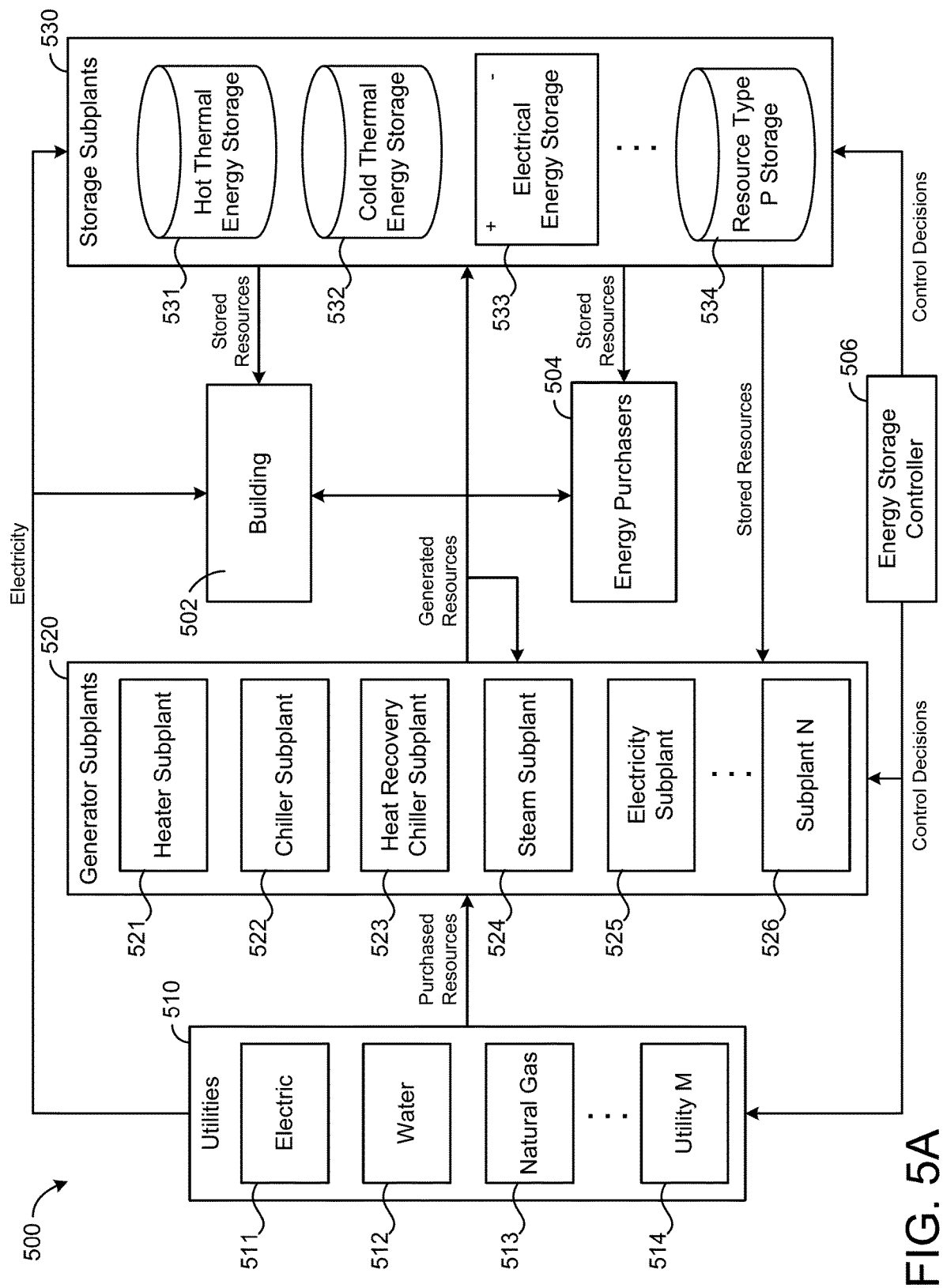
FIG. 5A is a block diagram of an energy storage system including thermal energy storage and electrical energy storage, according to an exemplary embodiment.

Referring now to FIG. 5A, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5A, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization System

Figure 5B:
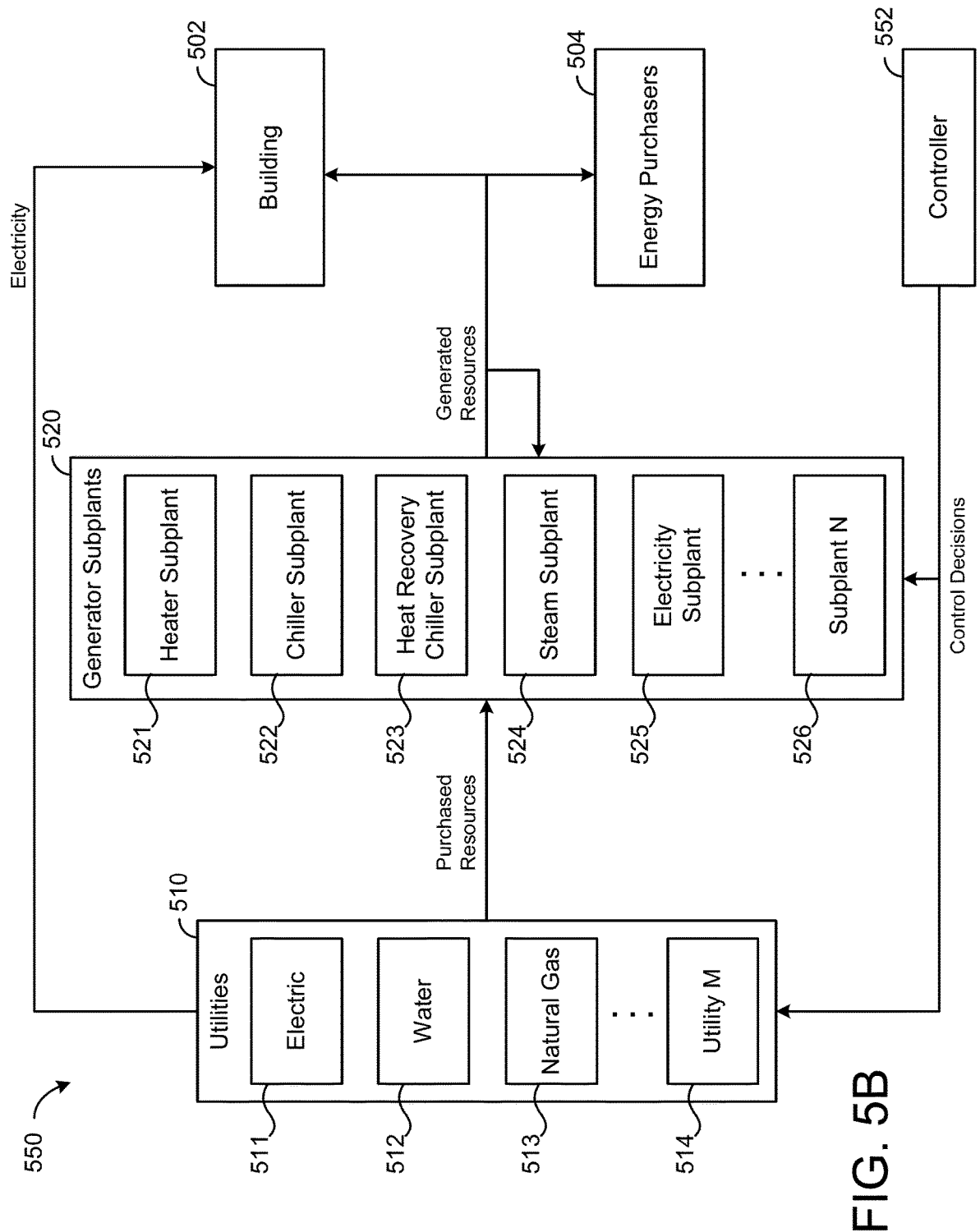
FIG. 5B is a block diagram of an energy cost optimization system without thermal or electrical energy storage, according to an exemplary embodiment.

Referring now to FIG. 5B, a block diagram of an energy cost optimization system 550 is shown, according to an exemplary embodiment. Energy cost optimization system 550 is shown to include many of the same components as energy storage system 500 (described with reference to FIG. 5A) with the exception of storage subplants 530. System 550 is an example of a system without thermal or electrical energy storage in which the peak load contribution cost optimization techniques can be implemented.

Energy cost optimization system 550 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 550. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 550 operates to satisfy the resource demand associated with building 502.

Energy cost optimization system 550 is shown to include a plurality of utilities 510. Utilities 510 may provide system 550 with resources such as electricity, water, natural gas, or any other resource that can be used by system 550 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 550 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 5B, energy cost optimization system 550 is shown to include a controller 552. Controller 552 may be configured to control the distribution, production, and usage of resources in system 550. In some embodiments, controller 552 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 552 may be configured to maximize the economic value of operating energy cost optimization system 550 over the duration of the optimization period. The economic value may be defined by a value function that expresses economic value as a function of the control decisions made by controller 552. The value function may account for the cost of resources purchased from utilities 510, revenue generated by selling resources to energy purchasers 504, and the cost of operating system 550. In some embodiments, the cost of operating system 550 includes a cost of excessive equipment start/stops during the optimization period.

Each of subplants 520 may include equipment that can be controlled by controller 552 to optimize the performance of system 550. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 552.

In some embodiments, one or more of subplants 520 includes a subplant level controller configured to control the equipment of the corresponding subplant. For example, controller 552 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 550 and controller 552 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6A:
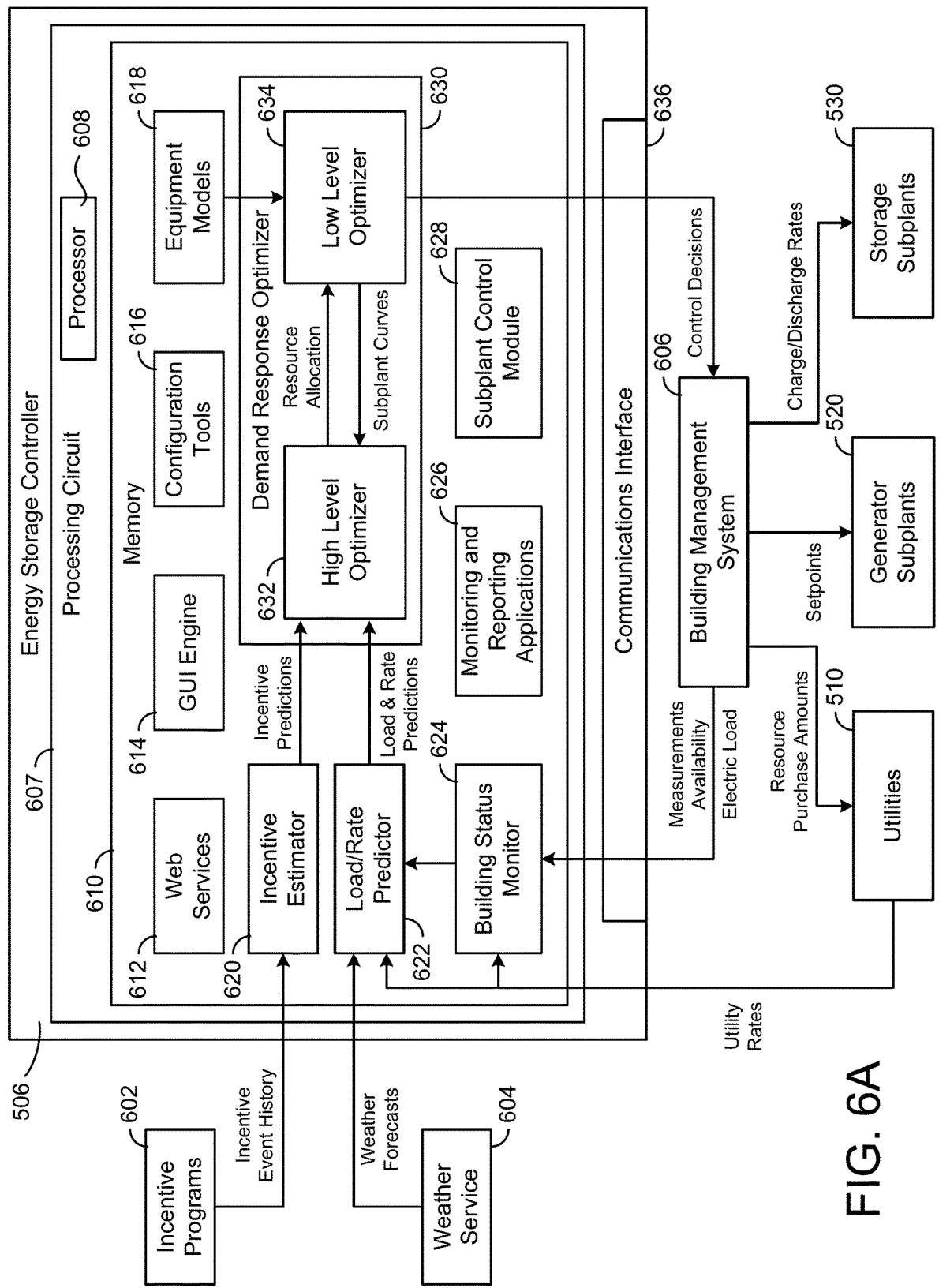
FIG. 6A is block diagram of an energy storage controller which may be used to operate the energy storage system of FIG. 5A, according to an exemplary embodiment.

Referring now to FIG. 6A, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6A, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure.

Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6A, memory 610 is shown to include a load/rate predictor 622. Load/rate predictor 622 may be configured to predict the thermal energy loads ($\hat{\ell}_k$) of the building or campus for each time step k (e.g., k=1 n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\phi_w$), a day type (day), the time of day (t), and previous measured load data ($Y_{k-1}$). Such a relationship is expressed in the following equation:

$$\hat{\ell}_k = f(\phi_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6A, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6A, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6A, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6A, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Energy Cost Optimization Controller

Figure 6B:
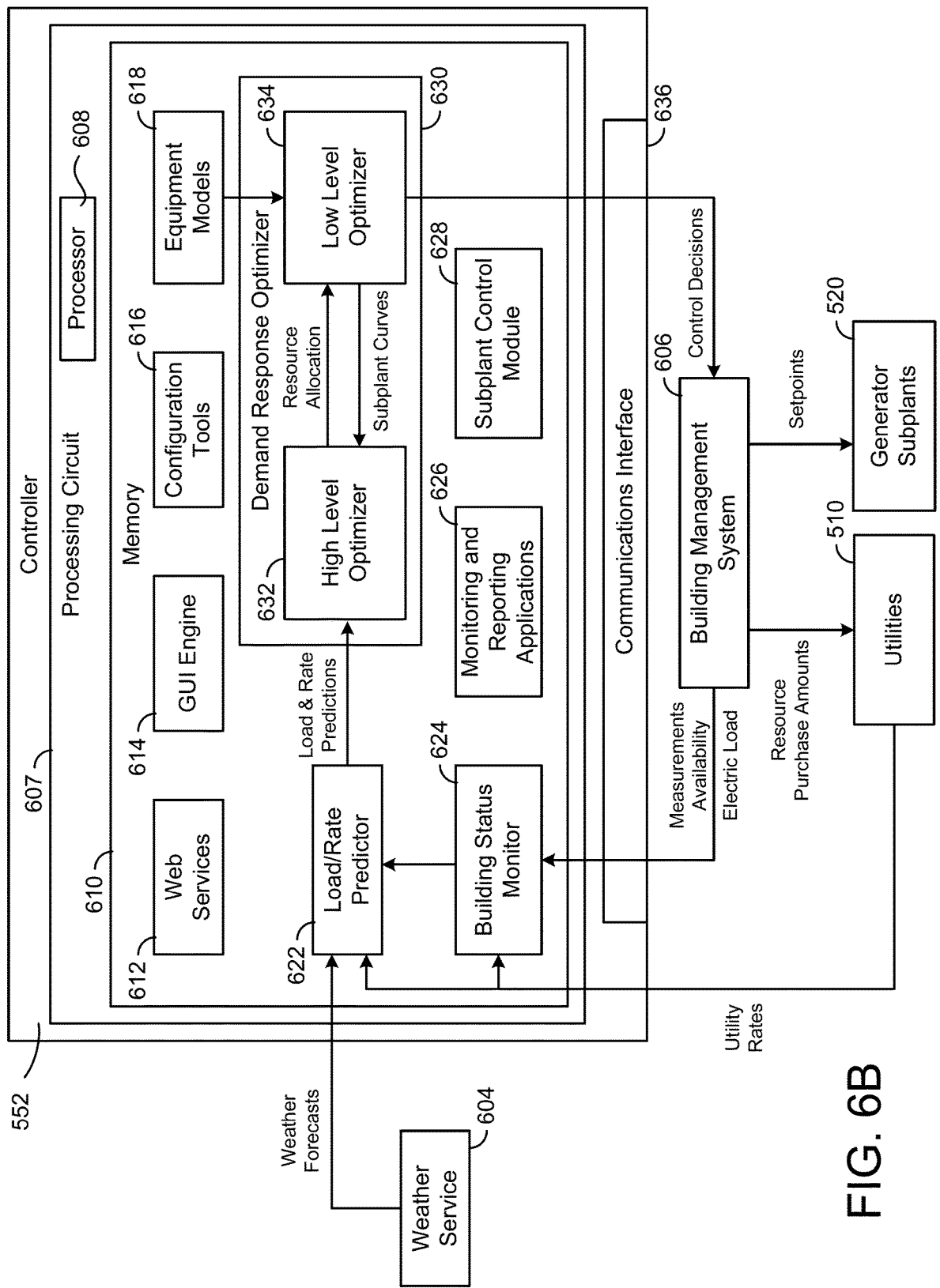
FIG. 6B is a block diagram of a controller which may be used to operate the energy cost optimization system of FIG. 5B, according to an exemplary embodiment.

Referring now to FIG. 6B, a block diagram illustrating controller 552 in greater detail is shown, according to an exemplary embodiment. Controller 552 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 552. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 552 specifying on/off states and/or setpoints for the subplant equipment. BMS 606 may control the equipment (e.g., via actuators, power relays, etc.) in accordance with the control signals provided by controller 552. For example, BMS 606 may operate the equipment using closed loop control to achieve the setpoints specified by energy storage controller 552. In various embodiments, BMS 606 may be combined with controller 552 or may be part of a separate building management system. According to an exemplary embodiment, BMS 606 is a METASYS® brand building management system, as sold by Johnson Controls, Inc.

Controller 552 may monitor the status of the controlled building using information received from BMS 606. Controller 552 may be configured to predict the thermal energy loads (e.g., heating loads, cooling loads, etc.) of the building for plurality of time steps in an optimization period (e.g., using weather forecasts from a weather service 604). Controller 552 may generate control decisions that optimize the economic value of operating system 550 over the duration of the optimization period subject to constraints on the optimization process (e.g., energy balance constraints, load satisfaction constraints, etc.). The optimization process performed by controller 552 is described in greater detail below.

Controller 552 is shown to include a communications interface 636 and a processing circuit 607 having a processor 608 and memory 610. These components may be the same as described with reference to FIG. 6A. For example, controller 552 is shown to include demand response optimizer 630. Demand response optimizer 630 may perform a cascaded optimization process to optimize the performance of system 550. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 552 may be the same as previously described with reference to FIG. 6A.

Planning Tool

Figure 7:
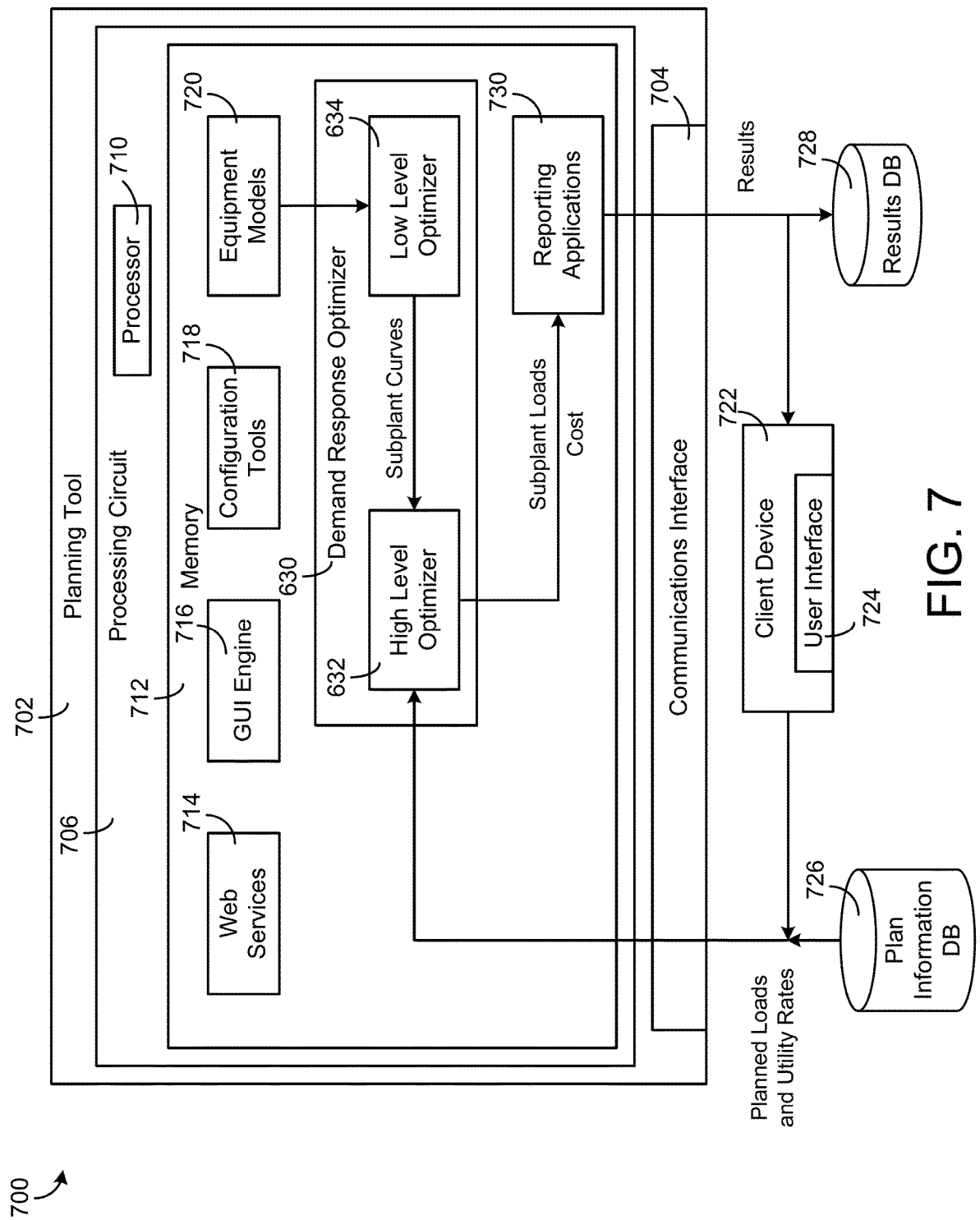
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIGS. 6A-6B. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5A. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
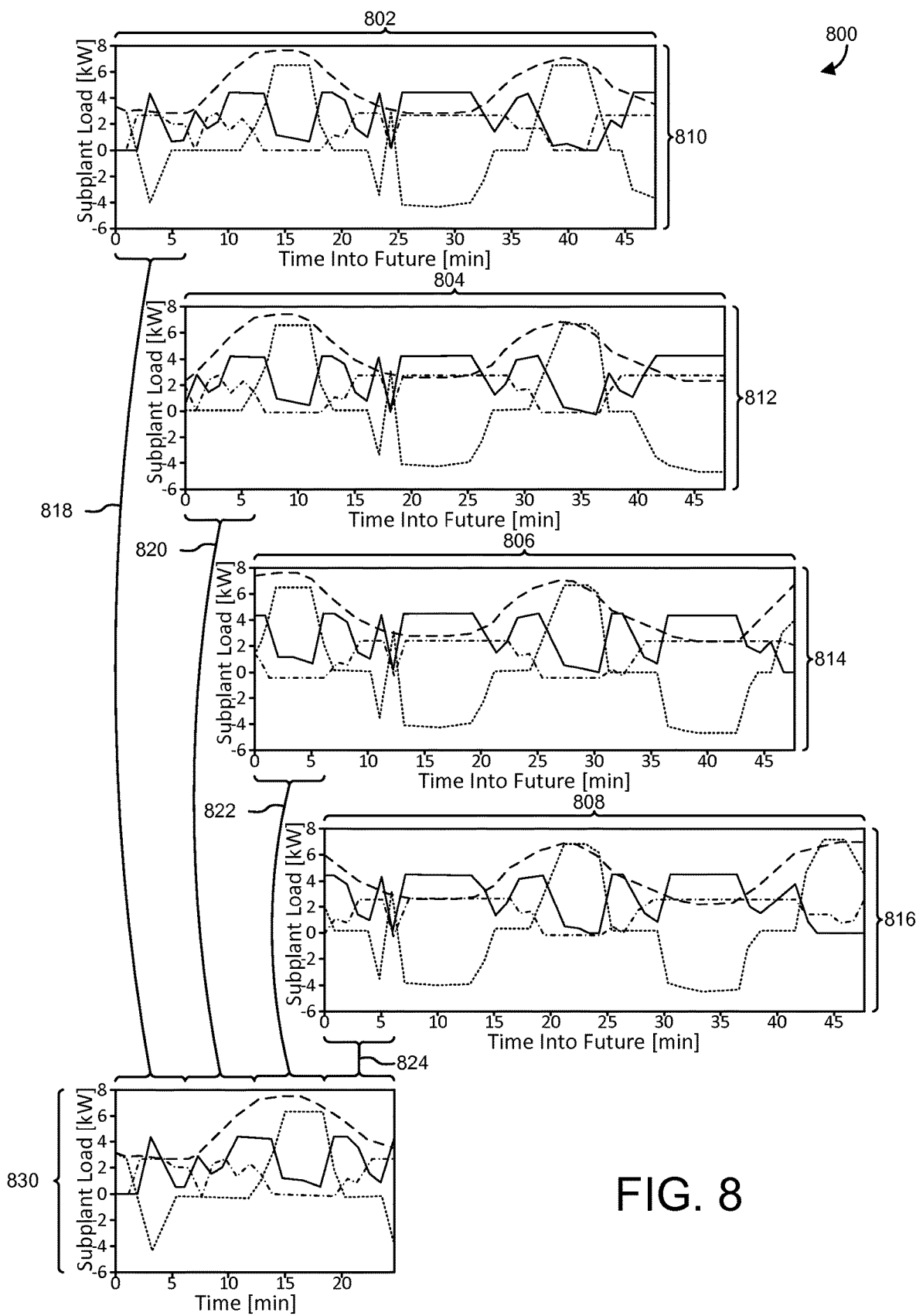
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9:
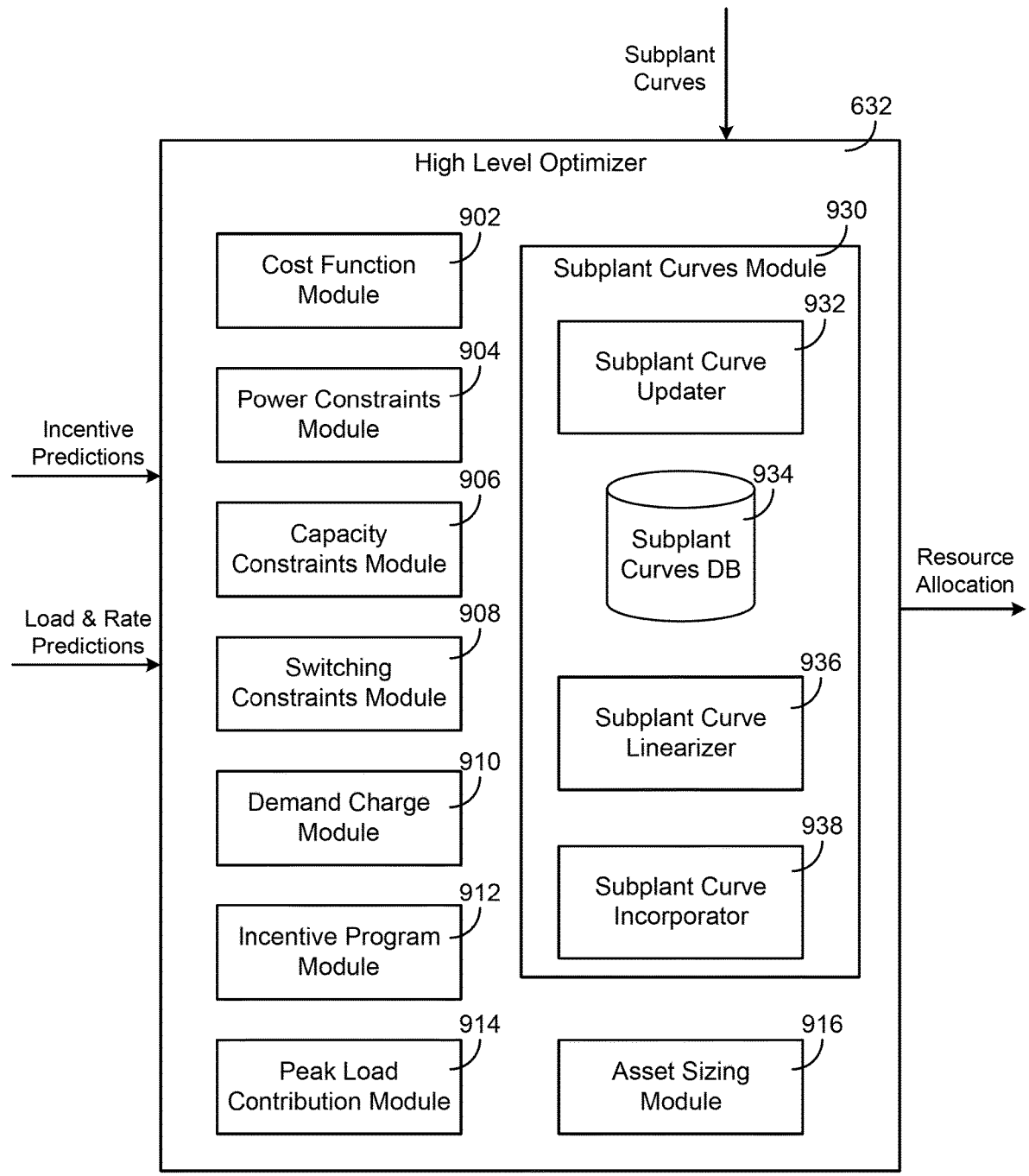
FIG. 9 is a block diagram of a high level optimizer which can be implemented as a component of the controllers of FIGS. 6A-6B or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 552, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

In some embodiments, the high level optimizer 632 executes a stochastic model predictive control optimization process, for example as described in U.S. patent application Ser. No. 16/115,290, filed Aug. 28, 2018, the entire disclosure of which is incorporated by reference herein. For example, the high level optimizer 632 may obtain representative loads and rates for a plurality of scenarios, determine a peak demand target or other constraint by minimizing a risk attribute over the plurality of scenarios, and then use the peak demand target or other constraint as a constraint on an optimization of a cost function (e.g., the cost function J(x) defined below). Various implementations and adaptations of the systems and methods described in U.S. patent application Ser. No. 16/115,290 are contemplated by the present disclosure.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\arg\max_x J(x)$$

where J(x) is defined as follows:

$$J(x) = \sum_{sources}\sum_{horizon} \text{cost}(\text{purchase}_{resource,time}, \text{time}) - \sum_{incentives}\sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs. In some embodiments, the cost function also includes an equipment degradation term (e.g., a function of x) that accounts for a cost associated with equipment degradation resulting from use of the equipment over the horizon. In some embodiments, the cost function also includes an equipment maintenance term (e.g., a function of x) that accounts for a cost associated with maintaining the equipment over the horizon.

High level optimizer 632 can optimize the cost function J(x) subject to the following constraint, which guarantees the balance between resources purchased, produced, discharged, consumed, and requested over the optimization horizon:

$$\sum_{sources} \text{purchase}_{resource,time} +$$

$$\sum_{subplants} \text{produces}(x_{internal,time}, x_{external,time}, v_{uncontrolled,time}) -$$

$$\sum_{subplants} \text{consumes}(x_{internal,time}, x_{external,time}, v_{uncontrolled,time}) +$$

$$\sum_{storages} \text{discharges}_{resource}(x_{internal,time}, x_{external,time}) -$$

$$\sum_{sinks} \text{requests}_{resource} = 0 \; \forall \text{ resources, } \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources} \left[ \sum_{q \in demands_s} w_{demand,s,q} r_{demand,s,q} \max_{i \in demands_{s,q}} (\text{purchase}_{s,i}) + \right.$$

$$\left. \sum_{horizon} r_{s,i} \text{purchase}_{s,i} \right] - \sum_{incentives} \sum_{horizon} \text{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $\text{purchase}_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} +$$

$$\sum_{i=k}^{k+h-1} r_{s_i} |P_{bat_i} - P_{bat_{i-1}}| + w_d r_d \max_i (-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9, high level optimizer 632 is shown to include a power constraints module 904. Power constraints module 904 may be configured to impose one or more power constraints on the objective function J(x). In some embodiments, power constraints module 904 generates and imposes the following constraints:

$$P_{bat_i} + P_{FR_i} \leq P_{eff}$$

$$-P_{bat_i} P_{FR_i} \leq P_{eff}$$

$$P_{bat_i} + P_{FR_i} \leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff} = P_{rated} - P_{PV\ FirmingReserve}$$

where $P_{rated}$ is the rated capacity of the battery and $P_{PV\ FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR} P_{FR_i} \\ C_a - \sum_{n=k}^{i} P_{bat_n} \geq C_{FR} P_{FR_i} \end{cases}$$

$$\forall i = k \ldots k+h-1$$

$$\begin{cases} C_a - \sum_{n=k}^{i} P_{bat_n} \leq C_{eff} - C_{FR} P_{FR_{i+1}} \\ C_a - \sum_{n=k}^{i} P_{bat_n} \geq C_{FR} P_{FR_{i+1}} \end{cases}$$

$$\forall i = k \ldots k+h-2$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff} - C_{FR}P_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff} - C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff} - C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff} - C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff} = (1 - C_{FR} - 2C_{socCM})C_{rated} - C_{PV\ FirmingReserve}$$

where $C_{socCM}$ is the control margin and $C_{PV\ FirmingReserve}$ is the capacity reserved for photovoltaic firming.

Still referring to FIG. 9, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i} |P_{bat_i} - P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} - P_{bat_{i-1}}$$
$$\forall i = k \ldots k+h-1$$
$$s_i > P_{bat_{i-1}} - P_{bat_i}$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \ldots \sum_{s \in sources} \sum_{q \in demands_s} w_{demand,s,q} r_{demand,s,q} \max_{i \in demand_{s,q}} (\text{purchase}_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \ldots \sum_{s \in sources} \sum_{q \in demands_s} w_{demand,s,q} r_{demand,s,q} \max_{i \in demand_{s,q}} (g_{s,q,i} \text{purchase}_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ $\forall$i=1, 2, 3, 8, 9, 10) and active during time steps i=4, 5, 6, 7, 11, 12 (i.e., $g_{s,q,i}=1$ $\forall$i=4, 5, 6, 7, 11, 12). Accordingly, the term $g_{s,q,i}$ purchase$_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $w_{demand,s,q}$ using the following equation:

$$w_{demand,s,q} = \frac{\sum_{k=k}^{k+h-1} g_{s,q,i}}{\sum_{k=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function J(x) to account for the N demand charges as shown in the following equation:

$$J(x) = \cdots + w_{d_1} r_{d_1} \max_i (g_{1_i}(-P_{bat_i} + eLoad_i)) + \cdots +$$
$$w_{d_q} r_{d_q} \max_i (g_{q_i}(-P_{bat_i} + eLoad_i)) + \cdots + w_{d_N} r_{d_N} \max_i (g_{N_i}(-P_{bat_i} + eLoad_i))$$

where the term $-P_{bat_i}+eLoad_i$ represents the total amount of electricity purchased from the electric grid during time step i (i.e., the total electric load $eLoad_i$ minus the power discharged from the battery $P_{bat_i}$). Each demand charge q=1 N can be accounted for separately in the cost function J(x) by including a separate max( ) function for each of the N demand charges. The parameter $r_{d_q}$ indicates the demand charge rate associated with the qth demand charge (e.g., $/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function J(x) by introducing an auxiliary variable $d_q$ for each demand charge q. In the case of the previous example, this will result in N auxiliary variables $d_1 \ldots d_N$ being introduced as decision variables in the cost function J(x). Demand charge module 910 can modify the cost function J(x) to include the linearized demand charge terms as shown in the following equation:

$$J(x) = \ldots + w_{d_1} r_{d_1} d_1 + \ldots + w_{d_q} r_{d_q} d_q + \ldots + w_{d_N} r_{d_N} d_N$$

Demand charge module 910 can impose the following constraints on the auxiliary demand charge variables $d_1 \ldots d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall i = k \ldots k+h-1, \quad g_{1_i} \neq 0$$
$$d_1 \geq 0 \qquad \vdots$$
$$d_q \geq g_{q_i}(-P_{bat_i} + eLoad_i) \quad \forall i = k \ldots k+h-1, \quad g_{q_i} \neq 0$$
$$d_q \geq 0 \qquad \vdots$$
$$d_N \geq g_{N_i}(-P_{bat_i} + eLoad_i) \quad \forall i = k \ldots k+h-1, \quad g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 . . . 3), where $g_q$ includes an element for each time step of the optimization period (i.e., $g_q = [g_{q_1} \ldots g_{q_{24}}]$). The three demand charge masks can be defined as follows:

$$g_{1_i} = 1 \; \forall i = 1 \ldots 24$$

$$g_{2_i} = 1 \; \forall i = 12 \ldots 18$$

$$g_{3_i} = 1 \; \forall i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Referring again to FIG. 9, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} \left( adjCBL_i - \left( eLoad_i - P_{bat_i} \right) \right) \right)$$

where $b_i$ is a binary decision variable indicating whether to participate in the ELDR program during time step i $r_{ELDR_i}$ is the ELDR incentive rate at which participation is compensated, and adjCBL$_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3}\left(eLoad_p - P_{bat_p} - \sum_{l=1}^{4}\frac{e_{lp}}{4}\right) - (eLoad_i - P_{bat_i})\right)\right)$$

where $e_{li}$ and $e_{lp}$ are the electric loads at the lth hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall i / r_{DA_i} \leq NBT_i \text{ and } i \in S \\ 0 & \text{otherwise} \end{cases}$$

where $r_{DA_i}$ is the hourly day-ahead price at the ith hour, NBT$_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{DA_i} \left(\sum_{p=m-4}^{m-2} -\frac{1}{3} P_{bat_p} + P_{bat_i}\right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., $/kW of the customer's PLC) in addition to the energy consumption charges and demand charges previously described.

PLC module 914 can be configured to modify the cost function J(x) to account for a cost associated with the customer's PLC. By incorporating PLC costs into the cost function J(x), PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May $31^{st}$ of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$PLC_{customer} = CLF \times \sum_{i=1}^{5} \frac{eLoad_{cp_i}}{5}$$

where $PLC_{customer}$ is the customer's peak load contribution calculated during year Y, CLF is the capacity loss factor (e.g., CLF=1.05), and $eLoad_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$PLC_{cost} = r_{PLC} \times PLC_{customer}$$

where $PLC_{cost}$ is the customer's PLC charge billed over the delivery year Y+1 (e.g., $) and $r_{PLC}$ is the rate at which the customer is charged for its PLC (e.g., $/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO) in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} eLoad_{cp_i}}{\sum_{i=1}^{5} sysLoad_{cp_i}}$$

where $sysLoad_{cp_i}$ is the region-wide peak load during the ith CP hour and $eLoad_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$GA_{cost,month} = \theta_{PDF} \times GA_{total,month}$$

where $GA_{cost,month}$ is the customer's monthly PLC cost (e.g., $) and $GA_{total,month}$ is the region-wide global adjustment cost (e.g., $). The value of $GA_{total,month}$ may be specified by IESO. In some embodiments, $GA_{total,month}$ has a known value. In other embodiments, the value of $GA_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours, for example by applying a peak hours mask (e.g., a peak hours vector) to the PLC term in the cost function J(x), where the peak hours mask is based on the projection of the peak hours for the optimization period. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as frequency regulation (FR) or economic load demand response (ELDR), including revenue as part of a capacity market program. Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function J(x). For example, the cost function J(x) may include terms corresponding to energy cost, multiple demand charges, PLC charges, and/or IBDR revenue, as previously described. Adding one or more new assets may affect the values of some or all of these terms in the original cost function J(x). For example, adding a battery asset may increase IBDR revenue and decrease energy cost, demand charges, and PLC charges. However, the original cost function J(x) may not account for the fixed and marginal costs resulting from new asset purchases. In order to account for these fixed and marginal costs, asset sizing module 916 may add new terms to the original cost function J(x).

Asset sizing module 916 can be configured to augment the cost function J(x) with two new terms that correspond to the cost of purchasing the new assets, resulting in an augmented cost function $J_a(x)$. The additional terms are shown in the following equation:

$$J_a(x) = J(x) + c_f^T v + c_s^T s_a$$

where J(x) is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, asset sizing module 916 scales the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$. These and other features of asset sizing module 916 are described in greater detail with reference to FIG. 10.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve. Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_i$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Asset Sizing Module

Figure 10:
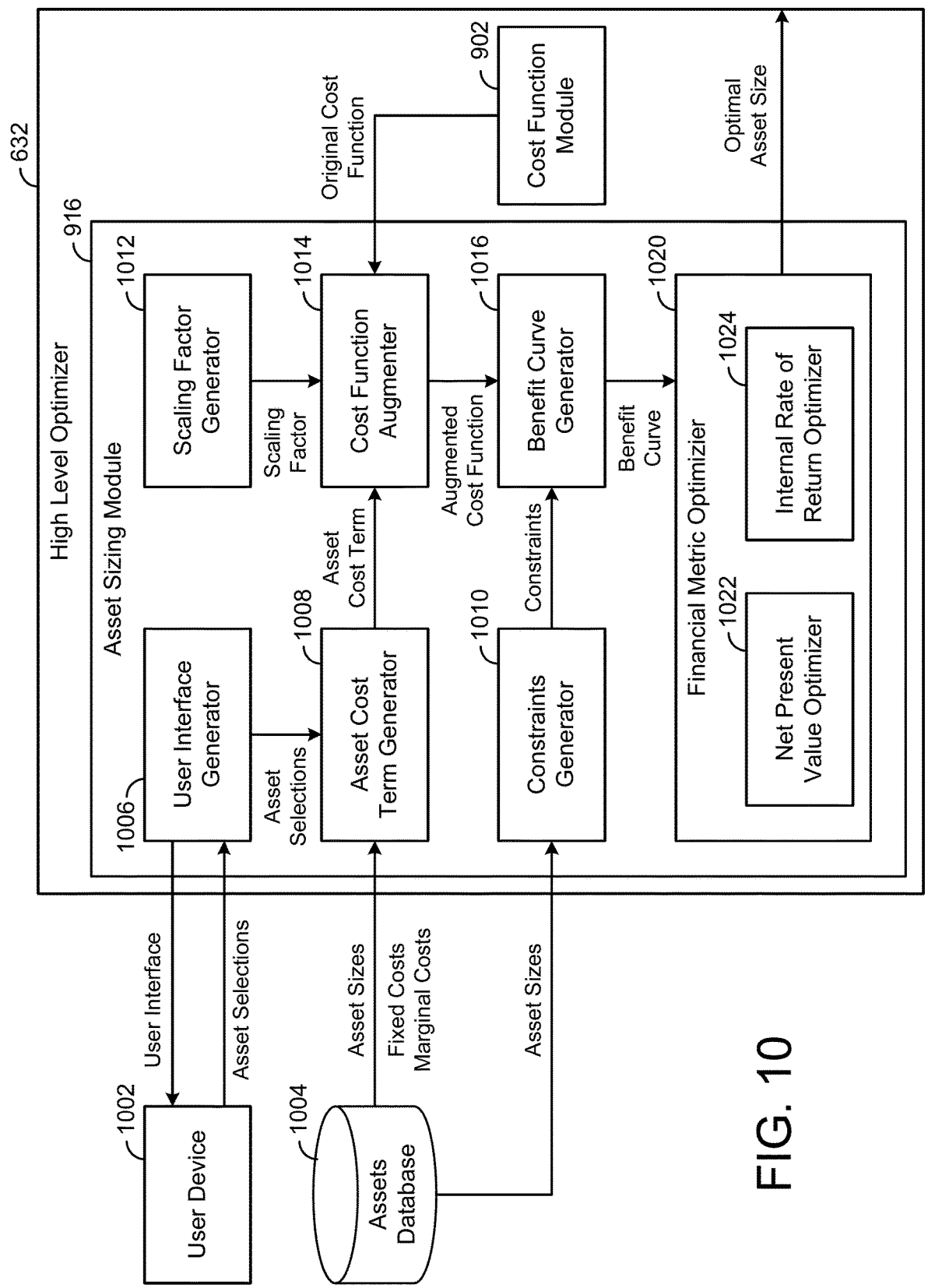
FIG. 10 is a block diagram illustrating the asset sizing module of FIG. 9 in greater detail, according to an exemplary embodiment.

Referring now to FIG. 10, a block diagram illustrating asset sizing module 916 in greater detail is shown, according to an exemplary embodiment. Asset sizing module 916 can be configured to determine the optimal sizes of various assets in a building, group of buildings, or a central plant. As described above, assets can include individual pieces of equipment (e.g., boilers, chillers, heat recovery chillers, steam generators, electrical generators, thermal energy storage tanks, batteries, etc.), groups of equipment, or entire subplants of a central plant. Asset sizes can include a maximum loading of the asset (e.g., maximum power, maximum charge/discharge rate) and/or a maximum capacity of the asset (e.g., maximum stored electric energy, maximum fluid storage, etc.).

In some embodiments, asset sizing module 916 includes a user interface generator 1006. User interface generator 1006 can be configured to generate a user interface for interacting with asset sizing module 916. The user interface may be provided to a user device 1002 (e.g., a computer workstation, a laptop, a tablet, a smartphone, etc.) and presented via a local display of user device 1002. In some embodiments, the user interface prompts a user to select one or more assets or types of assets to be sized. The selected assets can include assets currently in a building or central plant (e.g., existing assets the user is considering upgrading or replacing) or new assets not currently in the building or central plant (e.g., new assets the user is considering purchasing). For example, if the user is considering adding thermal energy storage or electrical energy storage to a building or central plant, the user may select "thermal energy storage" or "battery" from a list of potential assets to size/evaluate. User interface generator 1006 can identify any assets selected via the user interface and provide an indication of the selected assets to asset cost term generator 1008.

Asset cost term generator 1008 can be configured to generate one or more cost terms representing the purchase costs of the assets being sized. In some embodiments, asset cost term generator 1008 generates the following two asset cost terms:

$$c_f^T v + c_s^T s_a$$

where $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions in vector v and asset size decisions in vector $s_a$ can be treated as decision variables to be optimized along with other decision variables x in the augmented cost function $J_a(X)$, described in greater detail below.

It should be noted that the values of the binary decision variables in vector v and the continuous decision variables in vector $s_a$ indicate potential asset purchases and asset sizes which can be evaluated by asset sizing module 916 to determine whether such purchases/sizes optimize a given financial metric. The values of these decision variables can be adjusted by asset sizing module 916 as part of an optimization process and do not necessarily reflect actual purchases or a current set of assets installed in a building, set of buildings, or central plant. Throughout this disclosure, asset sizing module 916 is described as "purchasing" various assets or asset sizes. However, it should be understood that these purchases are merely hypothetical. For example, asset sizing module 916 can "purchase" an asset by setting the binary decision variable $v_j$ for the asset to a value of $v_j=1$. This indicates that the asset is considered purchased within a particular hypothetical scenario and the cost of the asset is included in the augmented cost function $J_a(x)$. Similarly, asset sizing module 916 can choose to not purchase an asset by setting the binary decision variable $v_j$ for the asset to a value of $v_j=0$. This indicates that the asset is considered not purchased within a particular hypothetical scenario and the cost of the asset is not included in the augmented cost function $J_a(x)$.

The additional cost terms $c_f^T v$ and $c_s^T s_a$ can be used to account for the purchase costs of any number of new assets. For example, if only a single asset is being sized, the vector $c_f$ may include a single fixed cost (i.e., the fixed cost of buying any size of the asset being considered) and v may include a single binary decision variable indicating whether the asset is purchased or not purchased (i.e., whether the fixed cost is incurred). The vector $c_s$ may include a single marginal cost element and $s_a$ may include a single continuous decision variable indicating the size of the asset to purchase. If the asset has both a maximum loading and a maximum capacity (i.e., the asset is a storage asset), the vector $c_s$ may include a first marginal cost per unit loading and a second marginal cost per unit capacity. Similarly, the vector $s_a$ may include a first continuous decision variable indicating the maximum loading size to purchase and a second continuous decision variable indicating the maximum capacity size to purchase.

If multiple assets are being sized, the vectors $c_f$, v, $c_s$, and $s_a$ may include elements for each asset. For example, the vector $c_f$ may include a fixed purchase cost for each asset being sized and v may include a binary decision variable indicating whether each asset is purchased. The vector $c_s$ may include a marginal cost element for each asset being considered and $s_a$ may include a continuous decision variable indicating the size of each asset to purchase. For any asset that has both a maximum loading and a maximum capacity, the vector $c_s$ may include multiple marginal cost elements (e.g., a marginal cost per unit loading size and a marginal cost per unit capacity size) and the vector $s_a$ may include multiple continuous decision variables (e.g., a maximum loading size to purchase and a maximum capacity size to purchase). By accounting for the purchase costs of multiple assets in terms of their respective sizes, the cost terms $c_f^T v$ and $c_s^T s_a$ allow high level optimizer 632 to optimize multiple asset sizes concurrently.

Still referring to FIG. 10, asset sizing module 916 is shown to include a constraints generator 1010. Constraints generator 1010 can be configured to generate or update the constraints on the optimization problem. As discussed above, the constraints prevent high level optimizer 632 from allocating a load to an asset that exceeds the asset's maximum loading. For example, the constraints may prevent high level optimizer 632 from allocating a cooling load to a chiller that exceeds the chiller's maximum cooling load or assigning a power setpoint to a battery that exceeds the battery's maximum charge/discharge rate. The constraints may also prevent high level optimizer 632 from allocating resources in a way that causes a storage asset to exceed its maximum capacity or deplete below its minimum capacity. For example, the constraints may prevent high level optimizer 632 from charging a battery or thermal energy storage tank above its maximum capacity or discharging below its minimum stored electric energy (e.g., below zero).

When asset sizes are fixed, the loading constraints can be written as follows:

$$x_{j,i,load} \leq x_{j,load_{max}}$$
$$\forall j = 1 \ldots N_a$$
$$\forall i = k \ldots k + h - 1$$

where $x_{j,i,load}$ is the load on asset j at time step i over the horizon, $x_{j,load_{max}}$ is the fixed maximum load of the asset j, and $N_a$ is the total number of assets. Similarly, the capacity constraints can be written as follows:

$$0 \le x_{j,i,cap} \le x_{j,cap_{max}}$$
$$\forall j = 1 \ldots N_a$$
$$\forall i = k \ldots k+h-1$$

where $x_{j,i,cap}$ is the capacity of asset j at time step i over the horizon and $x_{j,cap_{max}}$ is the fixed maximum capacity of the asset j. However, these constraints assume that the maximum load $x_{j,load_{max}}$ and maximum capacity $x_{j,cap_{max}}$ of an asset is fixed. When asset sizes are treated as optimization variables, the maximum load and capacity of an asset may be a function of the asset size purchased in the optimization problem (i.e., the size of the asset defined by the values of the binary and continuous decision variables in vectors v and $s_a$).

Constraints generator 1010 can be configured to update the loading constraints to accommodate a variable maximum loading for each asset being sized. In some embodiments, constraints generator 1010 updates the loading constraints to limit the maximum load of an asset to be less than or equal to the total size of the asset purchased in the optimization problem. For example, constraints generator 1010 can translate the loading constraints into the following:

$$x_{j,i,load} \le s_{a_{j,load}}$$
$$s_{a_{j,load}} \le M_j v_j$$
$$\forall j = 1 \ldots N_a$$

where $s_{a_{j,load}}$ is the loading size of asset j (i.e., the jth load size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the load on an asset $x_{j,i,load}$ is not greater than the size of the asset $s_{a_{j,load}}$ that is purchased. The second inequality forces the optimization to pay for the fixed cost of an asset before increasing the load size of the asset. In other words, asset j must be purchased (i.e., $v_j=1$) before the load size $s_{a_{j,load}}$ of asset j can be increased to a non-zero value.

Similarly, constraints generator 1010 can be configured to update the capacity constraints to accommodate a variable maximum capacity for each storage asset being sized. In some embodiments, constraints generator 1010 updates the capacity constraints to limit the capacity of an asset between zero and the total capacity of the asset purchased in the optimization problem. For example, constraints generator 1010 can translate the capacity constraints into the following:

$$0 \le x_{j,i,cap} \le s_{a_{j,cap}}$$
$$s_{a_{j,cap}} \le M_j v_j$$
$$\forall j = 1 \ldots N_a$$

where $s_{a_{j,cap}}$ is the capacity size of asset j (i.e., the jth capacity size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the capacity of an asset $x_{j,i,cap}$ at any time step i is between zero and the capacity size of the asset $s_{a_{j,cap}}$ that is purchased. The second inequality forces the optimization to pay for the fixed cost of an asset before increasing the capacity size of the asset. In other words, asset j must be purchased (i.e., $v_j=1$) before the capacity size $s_{a_{j,cap}}$ of asset j can be increased to a non-zero value.

The constraints generated or updated by constraints generator 1010 may be imposed on the optimization problem along with the other constraints generated by high level optimizer 632. In some embodiments, the loading constraints generated by constraints generator 1010 replace the power constraints generated by power constraints module 904. Similarly, the capacity constraints generated by constraints generator 1010 may replace the capacity constraints generated by capacity constraints module 906. However, the asset loading constraints and capacity constraints generated by constraints generator 1010 may be imposed in combination with the switching constraints generated by switching constraints module 908, the demand charge constraints generated by demand charge module 910, and any other constraints imposed by high level optimizer 632.

Still referring to FIG. 10, asset sizing module 916 is shown to include a scaling factor generator 1012. The cost of purchasing an asset is typically paid over the duration of a payback period, referred to herein as a simple payback period (SPP). However, the original cost function $J(x)$ may only capture operational costs and benefits over the optimization period h, which is often much shorter than the SPP. In order to combine the asset purchase costs $c_f^T v$ and $c_s^T s_a$ with the original cost function $J(x)$, it may be necessary to place the costs on the same time scale.

In some embodiments, scaling factor generator 1012 generates a scaling factor for the asset cost terms $c_f^T v$ and $c_s^T s_a$. The scaling factor can be used to scale the asset purchase costs $c_f^T v$ and $c_s^T s_a$ to the duration of the optimization period h. For example, scaling factor generator 1012 can multiply the terms $c_f^T v$ and $c_s^T s_a$ by the ratio $$\frac{h}{SPP}$$

as shown in the following equation:

$$c_{scaled} = \frac{h}{8760 \cdot SPP}\left(c_f^T v + c_s^T s_a\right)$$

where $C_{scaled}$ is the purchase cost of the assets scaled to the optimization period, h is the duration of the optimization period in hours, SPP is the duration of the payback period in years, and 8760 is the number of hours in a year.

In other embodiments, scaling factor generator 1012 generates a scaling factor for the original cost function $J(x)$. The scaling factor can be used to extrapolate the original cost function $J(x)$ to the duration of the simple payback period SPP. For example, scaling factor generator 1012 can multiply the original cost function $J(x)$ by the ratio $$\frac{SPP}{h}$$

as shown in the following equation:

$$J(x)_{scaled} = \frac{8760 \cdot SPP}{h} J(x)$$

where $J(x)_{scaled}$ is the scaled cost function extrapolated to the duration of the simple payback period SPP, h is the duration of the optimization period in hours, SPP is the duration of the payback period in years, and 8760 is the number of hours in a year.

Still referring to FIG. 10, asset sizing module 916 is shown to include a cost function augmenter 1014. Cost function augmenter 1014 can be configured to augment the original cost function J(x) with the scaled purchase cost of the assets $C_{scaled}$. The result is an augmented cost function $J_a(x)$ as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$.

Still referring to FIG. 10, asset sizing module 916 is shown to include a benefit curve generator 1016. Benefit curve generator 1016 can be configured to generate a benefit curve based on the augmented cost function $J_a(x)$. In some embodiments, the benefit curve indicates the relationship between the initial investment cost $C_0$ of an asset (i.e., the cost of purchasing the asset) and the annual benefit C derived from the asset. For example, the benefit curve may express the initial investment cost $C_0$ as a function of the annual benefit C, as shown in the following equation:

$$C_0 = f(C)$$

where both the initial investment cost $C_0$ and the annual benefit C are functions of the asset size. Several examples of benefit curves which can be generated by benefit curve generator 1016 are shown in FIGS. 12-15 (discussed in greater detail below).

In some embodiments, the initial investment cost $C_0$ is the term $c_f^T v + c_s^T s_a$ in the augmented cost function $J_a(x)$. The benefit of an asset over the optimization horizon h may correspond to the term J(x) in the augmented cost function $J_a(x)$ and may be represented by the variable $C_h$. In some embodiments, the variable $C_h$ represents the difference between a first value of J(x) when the asset is not included in the optimization and a second value of J(x) when the asset is included in the optimization. The annual benefit C can be found by extrapolating the benefit over the horizon $C_h$ to a full year. For example, the benefit over the horizon $C_h$ can be scaled to a full year as shown in the following equation:

$$C = \frac{8760}{h} C_h$$

where h is the duration of the optimization horizon in hours and 8760 is the number of hours in a year.

Increasing the size of an asset increases both its initial cost $C_0$ and the annual benefit C derived from the asset. However, the benefit C of an asset will diminish beyond a certain asset size or initial asset cost $C_0$. In other words, choosing an asset with a larger size will not yield any increased benefit. The benefit curve indicates the relationship between $C_0$ and C and can be used to find the asset size that optimizes a given financial metric (e.g., SPP, NPV, IRR, etc.). Several examples of such an optimization are described in detail below. In some embodiments, benefit curve generator 1016 provides the benefit curve to financial metric optimizer 1020 for use in optimizing a financial metric.

Still referring to FIG. 10, asset sizing module 916 is shown to include a financial metric optimizer 1020. Financial metric optimizer 1020 can be configured to find an asset size that optimizes a given financial metric. The financial metric may be net present value (NPV), internal rate of return (IRR), simple payback period (SPP), or any other financial metric which can be optimized as a function of asset size. In some embodiments, the financial metric to be optimized is selected by a user. For example, the user interface generated by user interface generator 1006 may prompt the user to select the financial metric to be optimized. In other embodiments, asset sizing module 916 may automatically determine the financial metric to be optimized or may optimize multiple financial metrics concurrently (e.g., running parallel optimization processes).

Net Present Value Optimization

Financial metric optimizer 1020 is shown to include a net present value (NPV) optimizer 1022. NPV optimizer 1022 can be configured to find an asset size that optimizes the net present value of the system in which the asset will be used. The NPV of a system can be calculated as shown below:

$$NPV = NPV_{asset} - C_0$$

where NPV is the net present value of the system, $NPV_{asset}$ is the net present value of the asset, and $C_0$ is the initial purchase cost of the asset. In some embodiments, the NPV of the asset is an annuity which can be calculated as follows:

$$NPV_{asset} = \sum_{t=1}^{N} \frac{C_t}{(1+r)^t}$$

where r is the interest rate, $C_t$ is the benefit or cash flow of the system in year t, and N is the total number of financial years or life-cycle of the system.

In some embodiments, the annual benefit of the system is constant over its life cycle. Accordingly, the annual benefit C may be equivalent to the benefit $C_t$, as shown in the following equation:

$$C_t = C \, \forall t$$

This allows the annuity $NPV_{asset}$ to be expressed as follows:

$$NPV_{asset} = a(r,N)C$$

where $a(r,N)$ is the annuity factor. The annuity factor $a(r,N)$ may be the sum of a geometric sequence having the following expression:

$$a(r, N) = \frac{1 - (1+r)^{-N}}{r}$$

Figure 11:
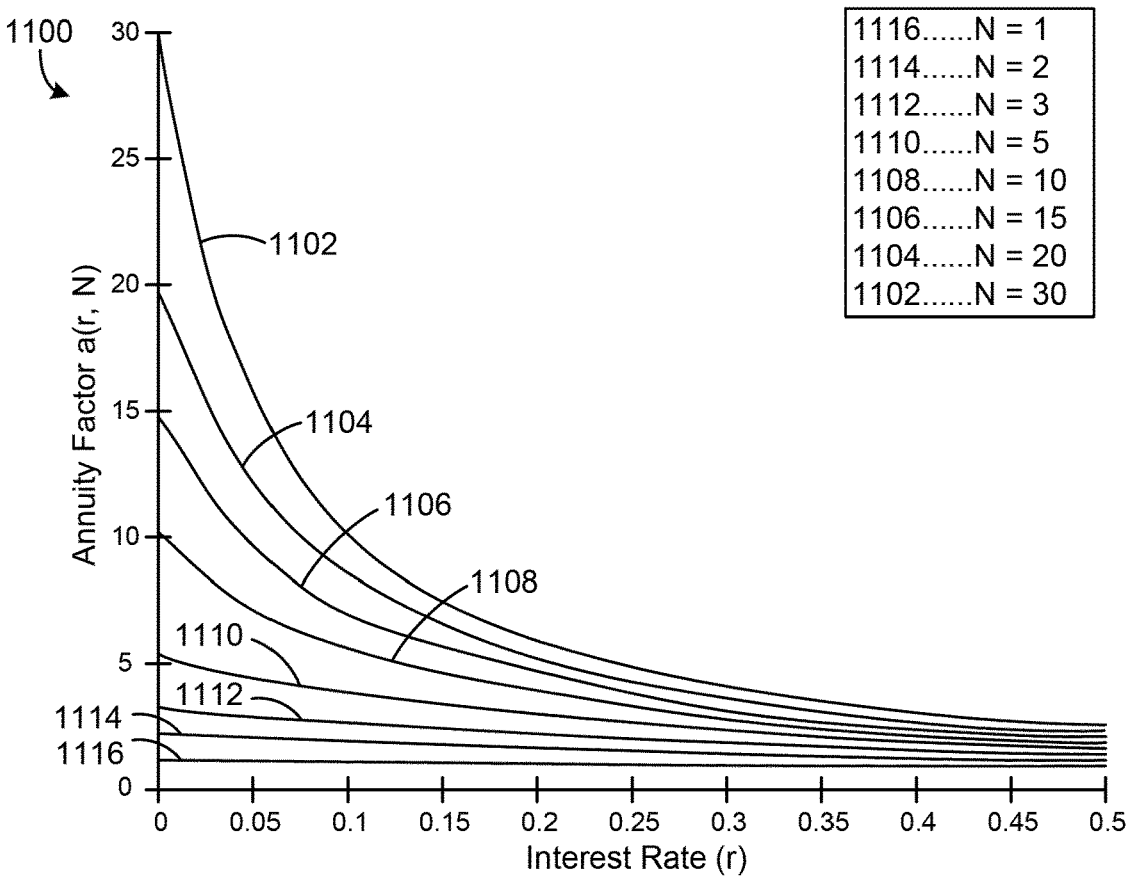
FIG. 11 is a graph illustrating an inverse relationship between an annuity factor and an interest rate for various values of a system life-cycle, according to an exemplary embodiment.

The annuity NPV asset represents the net present value of the annual benefit over the life-cycle of the system. FIG. 11 shows a graph 1100 of the annuity factor $a(r,N)$ as a function of the interest rate r for several system life-cycles. In graph 1100, line 1116 corresponds to a system life-cycle of one year (N=1), line 1114 corresponds to a system life-cycle of two years (N=2), line 1112 corresponds to a system life-cycle of three years (N=3), line 1110 corresponds to a system life-cycle of five years (N=5), line 1108 corresponds to a system life-cycle of ten years (N=10), line 1106 corresponds to a system life-cycle of fifteen years (N=15), line 1104 corresponds to a system life-cycle of twenty years (N=20), and line 1102 corresponds to a system life-cycle of thirty years (N=30). For a given system life-cycle, the annuity factor $a(r,N)$ is generally a decreasing function of the interest rate r. If the inverse of the interest rate r is much less than the life-cycle of the system (i.e., $$\frac{1}{r} \ll N),$$

the annuity factor $a(r,N)$ can be approximated by $$\frac{1}{r}.$$

By substituting $NPV_{asset} = a(r,N)C$ into the equation for the net present value of the system, the net present value of the system can be written as follows:

$$NPV = a(r,N)C - C_0$$

where C is the annual benefit of the asset and $C_0$ is the initial purchase cost of the asset. As discussed above, the initial investment cost $C_0$ may be equivalent to the term $c_f^T v + c_s^T s_a$ in the augmented cost function $J_a(x)$. The benefit of an asset over the optimization horizon h may correspond to the term $J(x)$ in the augmented cost function $J_a(x)$ and may be represented by the variable $C_h$. The annual benefit C can be found by extrapolating the benefit over the horizon $C_h$ to a full year. For example, the benefit over the horizon $C_h$ can be scaled to a full year as shown in the following equation:

$$C = \frac{8760}{h} C_h$$

where h is the duration of the optimization horizon in hours and 8760 is the number of hours in a year. Accordingly, the net present value of the system can be written as follows:

$$NPV = \frac{8760 \cdot a(r, N)}{h} C_h - (c_f^T v + c_s^T s_a)$$

In some embodiments, NPV optimizer 1022 scales the net present value of the system NPV to the duration of the optimization period h. For example, NPV optimizer 1022 can divide the previous equation for NPV by the factor $$\frac{8760 \cdot a(r, N)}{h}$$

and replace $C_h$ with me original cost function $J(x)$. This results in the following expression for the augmented cost function $J_a(x)$:

$$J_a(x) = J(x) + \frac{h}{8760 \cdot a(r, N)} (c_f^T v + c_s^T s_a)$$

which is similar to the other expression of the augmented cost function $J_a(x)$ previously described:

$$J_a(x) = J(x) + \frac{h}{8760 \cdot SPP} (c_f^T v + c_s^T s_a)$$

The first expression for $J_a(x)$ includes the annuity factor $a(r,N)$ in the denominator of the factor weighting the asset cost, whereas the second expression for $J_a(x)$ includes the target simple payback period SPP. This similarity indicates that the annuity factor $a(r,N)$ plays an important role in the optimization of a financial metric as a function of asset size.

As discussed above, the net present value of a system NPV can be expressed by the equation:

$$NPV = a(r,N)C - C_0$$

which can be rearranged as follows:

$$C_0 = a(r,N)C - NPV$$

Figure 13:
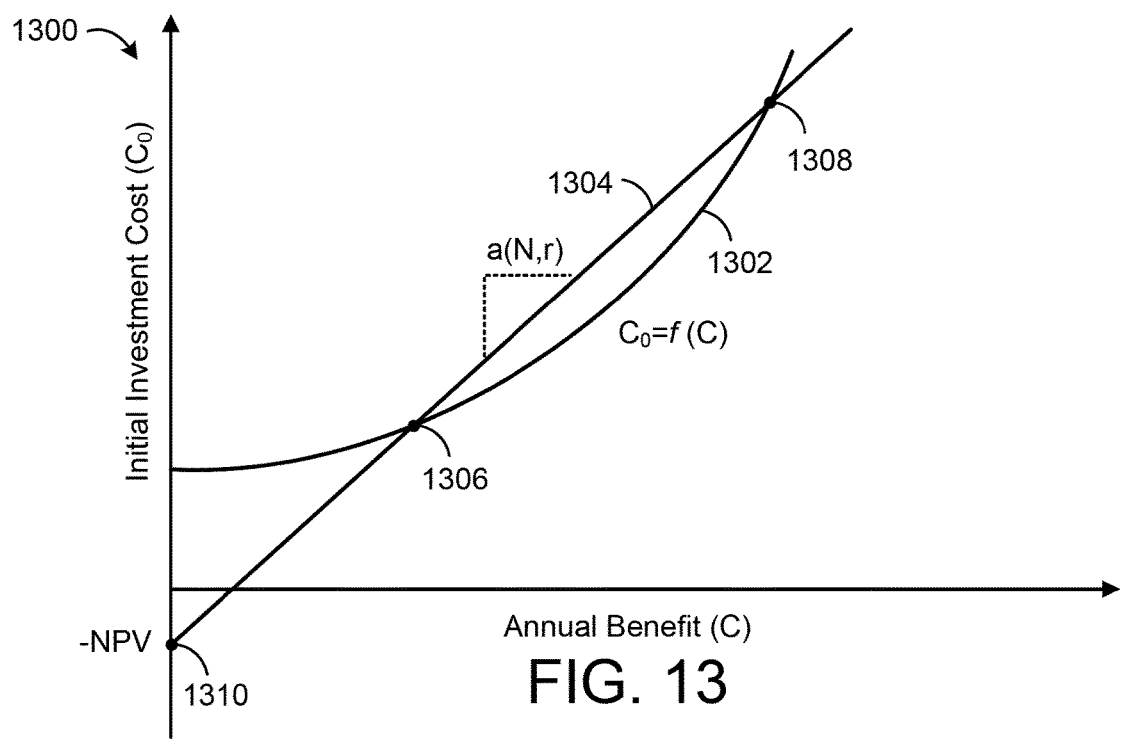
FIG. 13 is another graph of the initial investment cost of an asset as a function of the annual benefit of the asset, according to an exemplary embodiment.
Figure 14:
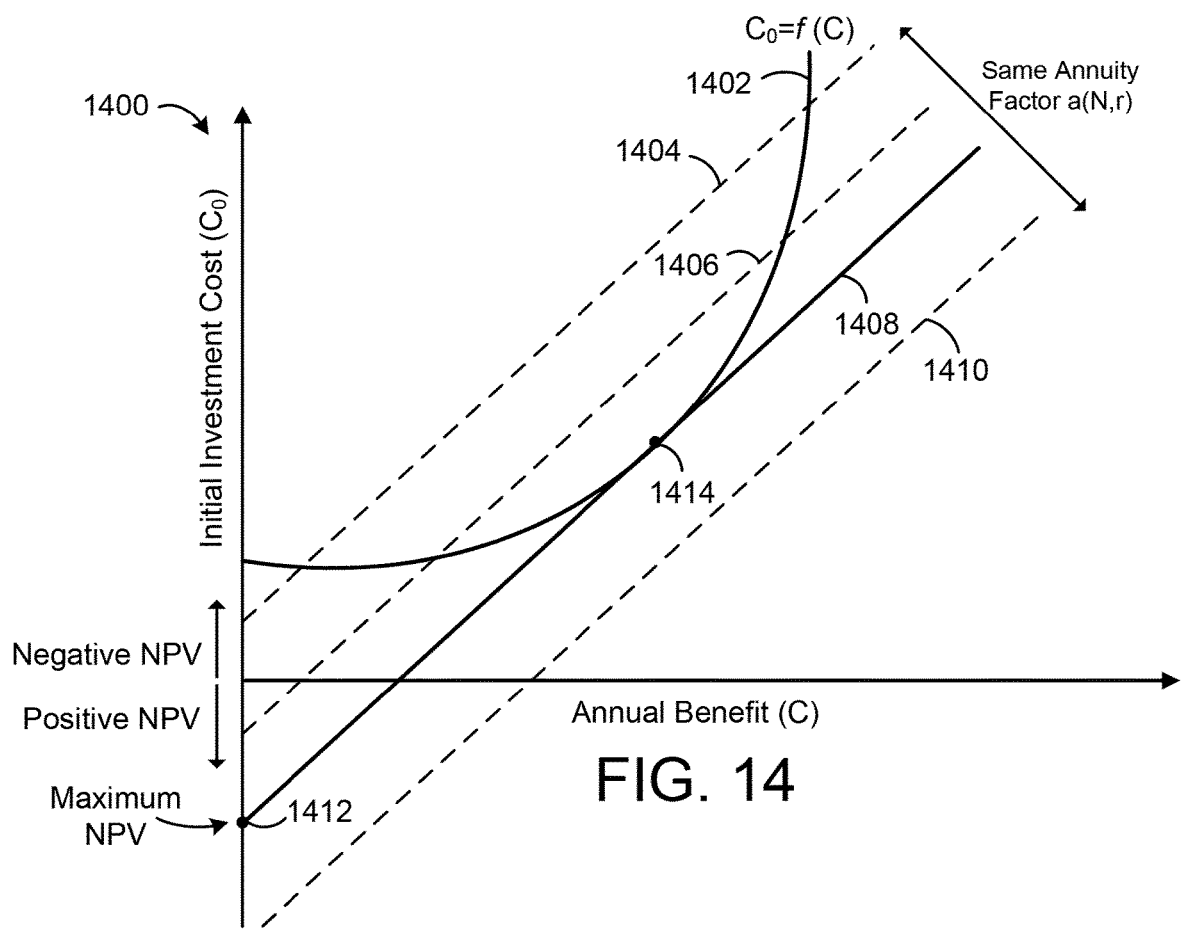
FIG. 14 is another graph of the initial investment cost of an asset as a function of the annual benefit of the asset, according to an exemplary embodiment.

This equation for $C_0$ can be plotted as a straight line with a slope equal to the annuity factor $a(r,N)$ and a y-intercept equal to the negative net present value $-NPV$. Several examples of such plots are shown in FIGS. 12-14.

Figure 12:
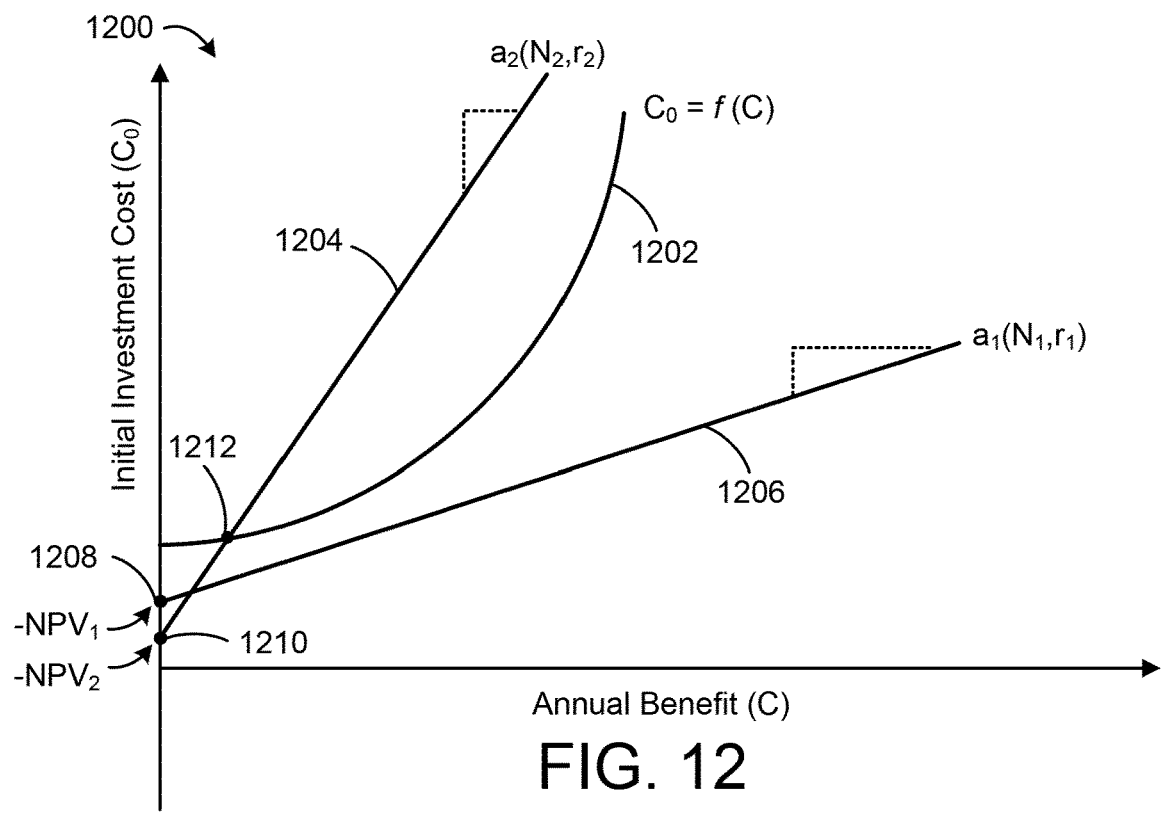
FIG. 12 is a graph of the initial investment cost of an asset as a function of the annual benefit of the asset, according to an exemplary embodiment.

Referring now to FIG. 12 a graph 1200 of initial investment cost $C_0$ as a function of annual benefit C is shown, according to an exemplary embodiment. Graph 1200 is shown to include a benefit curve 1202. Benefit curve 1202 is an example of a benefit curve for an asset or collection of assets being sized. In some embodiments, benefit curve 1202 is generated by benefit curve generator 1016, as previously described. Increasing the size of an asset increases both its initial cost $C_0$ and the annual benefit C derived from the asset. However, the annual benefit C of an asset may approach a limit (e.g., a vertical asymptote in graph 1200) as the asset size or initial investment cost $C_0$ continues to increase. This effect can be seen in the curvature of benefit curve 1202. As the initial investment cost $C_0$ increases, the corresponding changes in the annual benefit C diminish and eventually become insignificant.

Graph 1200 is shown to include two linear lines 1204 and 1206. Both lines 1204 and 1206 have the form $C_0 = a(r,N)C - NPV$, where $a(r,N)$ is the slope and $-NPV$ is the y-intercept. For example, line 1206 has a slope of $a_1(r_1, N_1)$, which is the annuity factor defined by a first interest rate $r_1$ and a first system life-cycle $N_1$. Line 1206 intersects the y-axis at point 1208, which corresponds to the negative net present value of the system $-NPV_1$. Similarly, line 1204 has a slope of $a_2(r_2, N_2)$, which corresponds to an annuity factor defined by a second interest rate $r_2$ and a second system life-cycle $N_2$. Line 1204 intersects the y-axis at point 1208, which corresponds to the negative net present value of the system $-NPV_2$.

Graph 1200 is shown to include an intersection point 1212. Point 1212 is the point at which line 1204 intersects benefit curve 1202. Intersection point 1212 is a feasible solution to the NPV optimization given the annuity factor $a_2$ ($r_2, N_2$) and the benefit curve 1202. In other words, intersection point 1212 represents a shared point between the set of possible operating points defined by the annuity factor $a_2(r_2, N_2)$ (i.e., all the points along line 1204) and the set of possible operating points defined by the asset size and the resulting benefit curve 1202 (i.e., all the points along benefit curve 1202). Line 1206 does not intersect benefit curve 1202. This indicates that the annuity factor $a_1(r_1, N_1)$ is too small to yield a solution for the asset size and resulting benefit curve 1202.

It should be noted that while the annuity factor $a_2$ ($r_2, N_2$) yields a feasible solution, this solution results in a negative net present value (i.e., $-NPV_2$) at point 1210. In graph 1200, the value of the y-intercept is the negative net present value (i.e., $-NPV$). Lines that intercept the positive y-axis have a positive y-intercept and therefore a negative net present value. Conversely, lines that intercept the negative y-axis have a negative y-intercept and therefore a positive net present value.

Referring now to FIG. 13, another graph 1300 of initial investment cost $C_0$ as a function of annual benefit C is shown, according to an exemplary embodiment. Graph 1300 is shown to include a benefit curve 1302 and a straight line 1304. Line 1304 has the slope $a(r,N)$ which can be determined based on specified values for the interest rate r and system life-cycle N. The annuity factor $a(r,N)$ yields two possible solutions indicated by intersection points 1306 and 1308. Both of these solutions have a positive net present value NPV indicated by negative value of the y-intercept 1310 (the negative of the net present value is negative, which makes the net present value positive). It is apparent from these examples that the asset size solution is dependent upon the annuity factor $a(r,N)$, which can be a function of the system life-cycle N and the target interest rate r and/or target payback period SPP.

In some embodiments, the interest rate r and the system life-cycle N are provided as inputs to NPV optimizer 1022. For example, the interest rate r and system life-cycle N can be specified by a user (e.g., received as inputs via a user interface), retrieved from memory, received from an external system or device, or otherwise provided as input parameters. NPV optimizer 1022 can be configured to calculate an annuity factor $a(r,N)$ based on specified values for the interest rate r and system life-cycle N. The calculated annuity factor $a(r,N)$ may define the slope of a straight line (e.g., line 1204, line 1206, line 1304) which can be used to optimize the net present value of the system NPV.

Referring now to FIG. 14, another graph 1400 of initial investment cost $C_0$ as a function of annual benefit C is shown, according to an exemplary embodiment. Graph 1400 is shown to include a benefit curve 1402 and a set of parallel lines 1404, 1406, 1408, and 1410. Each of the parallel lines 1404-1410 has the same annuity factor $a(r,N)$ and therefore the same slope in graph 1400. However, each of parallel lines 1404-1410 has a different y-intercept which corresponds to a different net present value.

Line 1404 intersects benefit curve 1402 at two locations, both of which represent feasible asset size solutions. However, line 1404 has a positive y-intercept, which indicates a negative net present value for both of these solutions. Line 1406 also intersects benefit curve 1402 at two locations, both of which represent feasible asset size solutions. Line 1406 has a negative y-intercept, which indicates that both of these solutions have a positive net present value. Line 1408 intersects benefit curve 1402 at a single location (i.e., intersection point 1414). This indicates a feasible asset size solution. Line 1408 has a negative y-intercept at point 1412, which indicates a positive net present value for this solution. Line 1410 does not intersect benefit curve 1402 and therefore does not yield an asset size solution.

NPV optimizer 1022 can be configured to find the asset size solution that results in a maximum NPV. From graph 1400, it is apparent that the maximum NPV results from an asset size at which the slope of the benefit curve 1402 is equal to the annuity factor $a(r,N)$. A line tangent to the benefit curve 1402 with a slope equal to the annuity factor $a(r,N)$ (i.e., line 1408) will intersect the benefit curve 1402 at a single point (i.e., point 1414) and will have a y-intercept that defines the maximum NPV (i.e., point 1412). Any line to the left of the tangent line 1408 (e.g., line 1404, line 1406) will yield a lower NPV. Any line to the right of the tangent line 1408 (e.g., line 1410) will not yield a solution because such lines do not intersect the benefit curve. The intersection point 1414 of the tangent line 1408 and the benefit curve 1402 indicates the asset size which maximizes the NPV.

In some embodiments, NPV optimizer 1022 determines the optimal asset size by finding the point at which the change in NPV (as a function of asset size) is equal to zero. For example, the NPV may be a function of both the annual benefit C and the purchase cost $C_0$, as shown in the following equation:

$$NPV = a(r,N)C - C_0$$

where both the annual benefit C and the initial purchase cost $C_0$ are a function of asset size. NPV optimizer 1022 can iteratively adjust asset size to find the point at which the change in NPV relative to the change in asset size is zero or closest to zero (e.g., $$\frac{\Delta NPV}{\Delta size} = 0).$$

This point is also the point at which the change in cost $C_0$ relative the change in benefit C is equal to the annuity factor (e.g., $$\frac{\Delta C_0}{\Delta C} = a(r, N)).$$

Battery Sizing Example

The following example illustrates an application of the asset sizing technique to an electrical energy storage system. The asset sizing technique can be used to determine the optimal size of a battery in the electrical energy storage system. A battery is a type of asset that has both a capacity size (i.e., an energy capacity) and a loading size (i.e., a power capacity). Accordingly, the optimal size of the battery may indicate both the optimal energy capacity and the optimal power capacity.

Asset sizing module 916 can add two continuous decision variable terms to the original cost function $J(x)$ to represent the energy capacity and the power capacity of the battery being sized. The continuous decision variable terms may have the form:

$w_{EUC}r_{EUC}C_{eff}$ and $w_{PUC}r_{PUC}P_{eff}$ where $r_{EUC}$ and $r_{PUC}$ are the per unit costs of energy capacity (e.g., \$/kWh) and power capacity (e.g., \$/kW), $C_{eff}$ and $P_{eff}$ are the continuous decision variables representing energy capacity (e.g., kWh) and power capacity (e.g., kW) of the battery being sized, and $W_{EUC}$ and $W_{PUC}$ are the weight adjustments of energy capacity cost and power capacity cost over the optimization period (i.e., the factors used to scale the costs to the duration of the optimization period).

Asset sizing module 916 can also add a binary decision variable term to the original cost function J(x) to represent the fixed cost associated with the battery being sized (i.e., the cost incurred regardless of energy capacity and power capacity). The binary decision variable term may have the form:

$w_{bat}r_{bat}v$ where $r_{bat}$ is the fixed cost of the battery being sized (e.g., \$), v is a binary decision variable indicating whether the battery is purchased or not purchased, and $W_{bat}$ is the weight adjustment of the fixed cost over the optimization period (i.e., the factor used to scale the cost to the duration of the optimization period). The weight parameters $w_{ax}$, $w_{PUC}$, and $w_{bat}$ may be functions of the duration of the optimization period and the annuity factor a(r,N). For example, the weight parameters may have the form:

$$w_{EUC} = w_{PUC} = w_{bat} = \frac{h}{8760 \cdot a(r, N)}$$

The following equation is an example of the augmented cost function $J_a(x)$ after the continuous decision variable terms and binary decision variable term are added:

$$J_a(x) = -\sum_{i=k}^{k+h-1} r_{e_i} P_{bat_i} - \sum_{i=k}^{k+h-1} r_{FR_i} P_{FR_i} +$$
$$\sum_{i=k}^{k+h-1} r_{s_i} s_i + w_d r_d d + w_{EUC} r_{EUC} C_{eff} + w_{PUC} r_{PUC} P_{eff} + w_{bat} r_{bat} v$$

where $P_{bat_i}$ is the allocated battery power (e.g., kW) for reducing energy cost and demand cost at the ith time step of the optimization period of duration h, $r_{e_i}$ is cost per unit of electricity (e.g., \$/kWh) at time step i, $P_{FR_i}$ is the battery power committed to frequency response (FR) participation (e.g., kW) at the ith time step, $r_{FR_i}$ is the FR incentive rate (e.g., \$/kWh) at time step i, $r_{s_i}$ is the cost associated with switching the power setpoint of the battery at time step i (e.g., \$/kWh), $s_i$ is the switching auxiliary variable (e.g., kW), $r_d$ is the applicable demand charge rate (e.g., \$/kW) corresponding to the demand charge period which overlaps with the optimization period, d is the electric demand (e.g., kW), $w_d$ is the weight adjustment of the demand charge (i.e., the factor used to scale the demand charge to the optimization period), and the remaining terms are the continuous decision variables and the binary decision variable terms, as previously described.

Asset sizing module 916 can optimize the augmented cost function $J_a(x)$ subject to the following constraints:

$P_{bat_i} + P_{FR_i} \leq P_{eff}$ $-P_{bat_i} + P_{FR_i} \leq P_{eff}$ $P_{bat_i} + P_{FR_i} \leq eLoad_i$ $$\begin{cases} C_a - \sum_{n=k}^{i} P_{bat_n} \leq C_{eff} - C_{FR} P_{FR_i} \\ C_a - \sum_{n=k}^{i} P_{bat_n} \geq C_{FR} P_{FR_i} \end{cases} \forall = k \ldots k+h-1$$

$$\begin{cases} C_a - \sum_{n=k}^{i} P_{bat_n} \leq C_{eff} - C_{FR} P_{FR_{i+1}} \\ C_a - \sum_{n=k}^{i} P_{bat_n} \geq C_{FR} P_{FR_{i+1}} \end{cases} \forall = k \ldots k+h-2$$

where $eLoad_i$ is the electric load at time step i (e.g., kWh), $C_a$ is the available battery capacity (e.g., kWh), and $C_{FR}$ is the FR reserve capacity (e.g., kWh/kW). The FR reserve capacity $C_{FR}$ may be the amount of energy in kWh to be reserved for FR per kW of power committed to FR.

In some embodiments, the constraints imposed by asset sizing module 916 also include:

$$\begin{cases} d > P_{bat_i} + eLoad_i \\ d > 0 \end{cases} \forall = k \ldots k+h-1$$

$$\begin{cases} s_i > P_{bat_i} - P_{bat_{i-1}} \\ s_i > P_{bat_{i-1}} - P_{bat_i} \end{cases} \forall = k \ldots k+h-1$$

$P_{bat_i} \leq P_{eff}$ $-P_{bat_i} \leq P_{eff}$ $C_{eff} - Mv \leq 0$ $P_{eff} - C_{rate} C_{eff} \leq 0$ where M is a very large number (e.g., $M=10^{10}$) and $C_{rate}$ is the maximum allowable power to energy ratio (e.g., $P_{eff}/C_{eff}$). This final constraint can be used to limit the power capacity and/or energy capacity of the battery such that $P_{eff}/C_{eff} \leq C_{rate}$.

Internal Rate of Return Optimization

Referring again to FIG. 10, financial metric optimizer 1020 is shown to include an internal rate of return (IRR) optimizer 1024. IRR optimizer 1024 can be configured to find an asset size that optimizes the internal rate of return of the system in which the asset will be used. In some embodiments, IRR is defined as the interest rate r that causes the NPV to be zero. Accordingly, IRR can be substituted for interest rate r in the equation:

$C_0 = a(r,N)C - NPV$ and NPV can be set to zero. This results in the following equation:

$C_0 = a(IRR,N)C$

This equation for $C_0$ is that of a straight line passing through the origin and having a slope equal to the annuity factor a(IRR,N). The annuity factor a(IRR,N) is a function of IRR and may be inversely proportional to IRR (as shown in FIG. 11). Accordingly, a decrease in IRR corresponds to an increase in the annuity factor a(IRR,N), and vice versa. However, an increase in the system life-cycle N or the simple payback period SPP may correspond to an increase in the annuity factor a(IRR,N).

Figure 15:
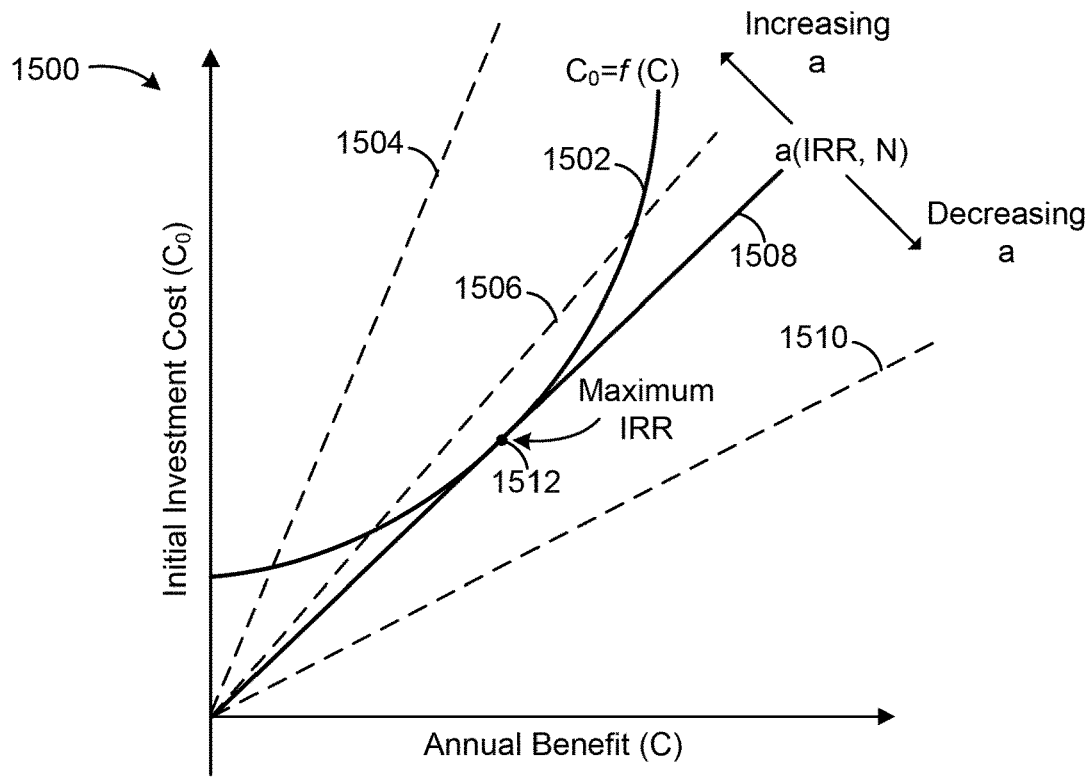
FIG. 15 is another graph of the initial investment cost of an asset as a function of the annual benefit of the asset, according to an exemplary embodiment.

Referring now to FIG. 15, another graph 1500 of initial investment cost $C_0$ as a function of annual benefit C is shown, according to an exemplary embodiment. Graph 1500 is shown to include a benefit curve 1502 and several straight lines 1504, 1506, 1508, and 1510. Each of lines 1504-1510 has the form $C_0=a(IRR,N)C$ with a y-intercept of zero and a slope equal to a different annuity factor a(IRR,N). Line 1510 has the smallest value of the annuity factor a(IRR,N) and does not intersect benefit curve 1502. This indicates that the annuity factor a(IRR,N) defining the slope of line 1510 does not yield an asset size solution. Lines 1504 and 1506 have larger values of the annuity factor a(IRR,N) and both intersect benefit curve 1502. This indicates that the annuity factors a(IRR,N) defining the slopes of lines 1504 and 1506 yield feasible asset size solutions. However, none of the solutions corresponding to lines 1504 or 1506 correspond to the maximum IRR.

Line 1508 is tangent to benefit curve 1502 and intersects benefit curve 1502 at a single point 1512. Intersection point 1512 indicates the maximum value of IRR. Any lines with a slope greater than the slope of line 1508 (e.g., lines 1504 and 1506) have a larger annuity factor a(IRR,N) and therefore a smaller value of IRR. Any lines with a slope less than the slope of line 1508 (e.g., line 1510) have a smaller annuity factor a(IRR,N), but do not intersect benefit curve 1502 and therefore do not yield feasible asset size solutions. The annuity factor a(IRR,N) defining the slope of line 1508 is the minimum annuity factor (and therefore maximum IRR) which results in a feasible asset size solution.

IRR optimizer 1024 can be configured to find the asset size solution that results in a maximum IRR. In some embodiments, IRR optimizer 1024 finds the optimal asset size by finding the point along benefit curve 1502 at which the slope of benefit curve 1502 is equal to the annuity factor a(IRR,N) (i.e., point 1512). At point 1512, the annuity factor a(IRR,N) has a slope equal to the tangent to benefit curve 1502. This is the point beyond which any marginal increase in asset size (e.g., a size increase made when the allowable effective payback period is increased) would result in a lower rate of return. In other words, point 1512 corresponds to the smallest economically viable asset size.

In some embodiments, IRR optimizer 1024 finds the asset size that optimizes IRR (or minimizes SPP) by incrementally increasing the target SPP or the target annuity factor a(IRR,N). For each target SPP value or target annuity factor value, IRR optimizer 1024 may solve the optimization problem over the duration of the optimization period (e.g., for an entire year). The solution to the optimization problem may indicate whether various assets are purchased or not purchased to achieve the optimal solution. IRR optimizer 1024 may identify the minimum target SPP value or target annuity factor that results in a solution in which an asset is purchased. The identified target SPP value or target annuity factor indicates the minimum viable payback period. The execution time required to implement the incremental increase approach may depend on the granularity with which the target SPP or annuity factor is increased. Lower granularity requires less execution time, but may select a minimum target SPP or annuity factor that exceeds the true minimum. Higher granularity may result in a solution that is closer to the true minimum, but may require more execution time.

In some embodiments, IRR optimizer 1024 uses a divide and check approach to find the asset size that optimizes IRR. In this approach, IRR optimizer 1024 may identify the midpoint of the payback period to be tested and may perform the optimization using the identified midpoint as the target SPP value. If an asset is purchased in that optimization, IRR optimizer 1024 can determine that the minimum target SPP value is between zero and the midpoint. If the asset is not purchased in that optimization, IRR optimizer 1024 can determine that the minimum target SPP value is between the midpoint and the end of the payback period to be tested. The payback period to be tested can then be updated to the half of the payback period in which the minimum target SPP value is known to exist. This process can be repeated iteratively to converge on the minimum target SPP value.

For example, the payback period to be tested may have a duration of 30 years. IRR optimizer 1024 can identify 15 years as the midpoint and can perform the asset size optimization using 15 years as the target SPP value. If an asset is purchased when 15 years is used as the target SPP value, IRR optimizer 1024 can determine that the minimum target SPP value is between zero and 15 years. If the asset is not purchased when 15 years is used as the target SPP value, IRR optimizer 1024 can determine that the minimum target SPP value is between 15 years and 30 years. The payback period to be tested can then be updated to either 0-15 years or 15-30 years, such that the new payback period to be tested includes the range in which the minimum target SPP value is known to exist. This process can be repeated iteratively until the payback period to be tested is reduced to a desired level of granularity.

Given the maximum payback period to be tested and the desired level of granularity, the number of iterations required to converge on a solution is equal to:

$$N_{runs} = \text{ceiling}\left\{\log_2\left(\frac{SPP_{max}}{\Delta SPP}\right)\right\}$$

where $N_{runs}$ is the number of iterations required, $\Delta SPP$ is the desired level of granularity (e.g., one day, one week, one year, etc.), and $SPP_{max}$ is the original duration of the payback period to be tested (e.g., 1 year, 10 years, 30 years, etc.). The result of this optimization is a value for the minimum target SPP value. IRR optimizer 1024 can use the minimum target SPP value to calculate the corresponding IRR. For example, IRR optimizer 1024 can set the annuity factor a(IRR,N) equal to the minimum target SPP and can find the value of IRR that achieves the specified value of a(IRR,N).

Asset Sizing Process

Figure 16:
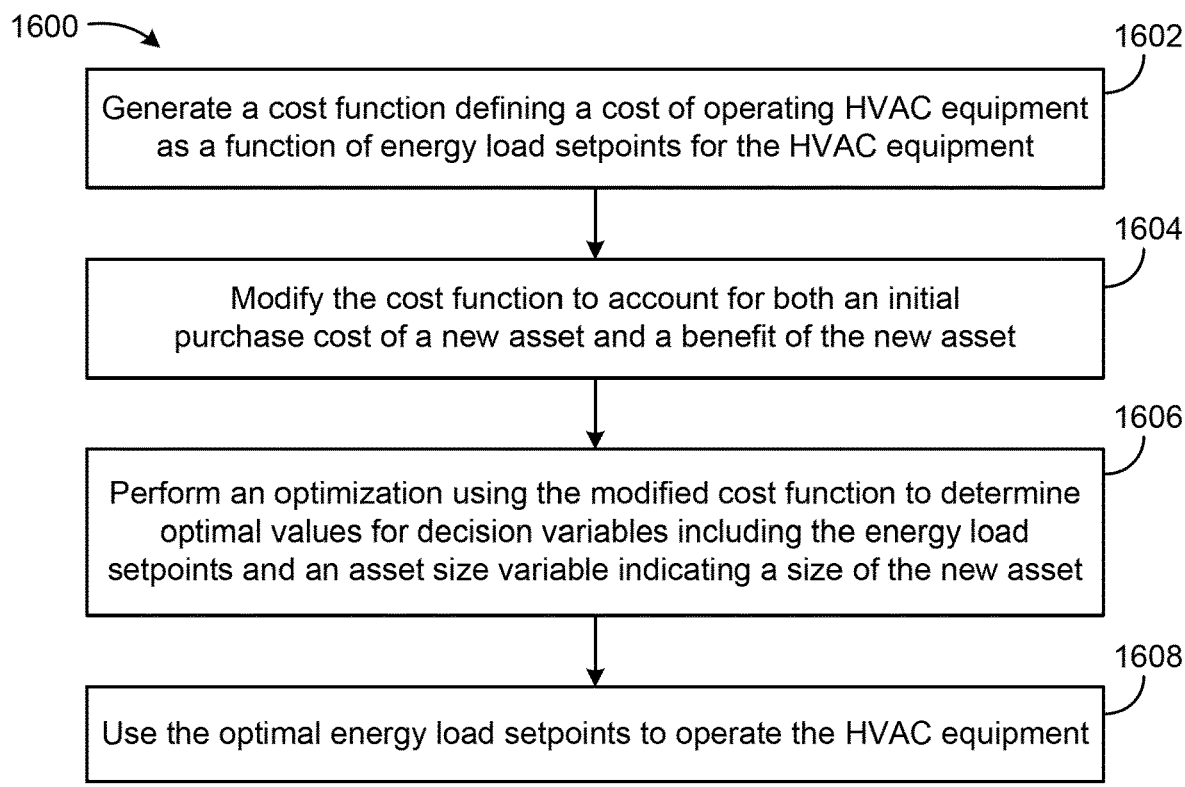
FIG. 16 is a flowchart of a process for determining optimal asset sizes, according to an exemplary embodiment.

Referring now to FIG. 16, a flowchart of a process 1600 for determining optimal asset sizes is shown, according to an exemplary embodiment. Process 1600 can be performed by one or more components of frequency response optimization system 100, photovoltaic energy system 300, energy storage system 500, planning system 700, or any other type of energy storage system. In some embodiments, process 1600 is performed by energy storage controller 506 (as described with reference to FIGS. 5A and 6A) or controller 552 (as described with reference to FIGS. 5B and 6B). In some embodiments, process 1600 is performed by various components of high level optimizer 632 (e.g., asset sizing module 916, cost function module 902, etc.) as described with reference to FIGS. 9-10.

Process 1600 is shown to include generating a cost function defining a cost of operating HVAC equipment as a function of energy load setpoints for the HVAC equipment (step 1602). In some embodiments, the cost function in step 1602 is the original cost function J(x). The cost function J(x) may include terms that accounts for energy purchase costs, demand charges, and peak load contribution (PLC) charges. In some embodiments, the cost function J(x) accounts for revenue from participating in IBDR programs such as frequency regulation (FR) or economic load demand response (ELDR).

The HVAC equipment may include individual HVAC devices (e.g., chillers, boilers, fans, pumps, valves, etc.) or collections of HVAC devices (e.g., a chiller subplant, a heater subplant, a cooling tower subplant, etc.). In some embodiments, the HVAC equipment include energy storage such as thermal energy storage and/or electrical energy storage (e.g., batteries). Although HVAC equipment is used as an example in process 1600, it should be understood that any type of equipment can be used. For example, the cost function generated in step 1602 may account for the cost associated with operating any type of equipment.

Still referring to FIG. 16, process 1600 is shown to include modifying the cost function to account for both an initial purchase cost of a new asset and a benefit of the new asset (step 1604). Step 1604 may include augmenting the cost function J(x) with two new terms that correspond to the cost of purchasing the new asset, resulting in an augmented cost function $J_a(x)$. The additional terms are shown in the following equation:

$$J_a(x) = J(x) + c_f^T v + c_s^T s_a$$

where J(x) is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding asset is purchased, $c_s$ is a vector of marginal costs per unit of asset size (e.g., cost per unit loading, cost per unit capacity), and $s_a$ is a vector of continuous decision variables corresponding to the asset size. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, step 1604 includes scaling the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, step 1604 may include multiplying the terms $c_f^T v$ and $c_s^T s_a$ by the ratio $$\frac{h}{SPP}$$

as shown in me following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

The benefit of the new asset may include, for example, reduced energy costs, reduced demand charges, reduced PLC charges, and/or increased revenue from participating in IBDR programs such as FR or ELDR. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit. Some of the benefits and costs of an asset may be captured by the original cost function J(x). For example, the cost function J(x) may include terms corresponding to energy cost, multiple demand charges, PLC charges, and/or IBDR revenue, as previously described.

Still referring to FIG. 16, process 1600 is shown to include performing an optimization using the modified cost function to determine optimal values for decision variables in the modified cost function (step 1606). The decision variables may include both the energy load setpoints and one or more asset size variables indicating the size of the new asset. In some embodiments, the asset size variables include a capacity size variable indicating a maximum capacity of the new asset and a loading size variable indicating a maximum loading of the new asset.

In some embodiments, step 1606 includes optimizing the cost defined by the modified cost function. In other embodiments, step 1606 includes optimizing a financial metric comprising at least one of net present value, internal rate of return, or simple payback period. Step 1606 may include using mixed integer linear programming to optimize the modified cost function and/or the financial metric.

In some embodiments, step 1606 includes generating a benefit curve defining a relationship between the initial purchase cost of the new asset and the benefit of the new asset. In some embodiments, step 1606 includes defining a net present value of the system as a function of the initial purchase cost of the new asset and the benefit of the new asset. Both the initial purchase cost and the benefit of the new asset may depend on the asset size variables. Step 1606 may include calculating the net present value of the system for a plurality of points along the benefit curve, optimizing the net present value by finding an optimal point along the benefit curve that maximizes the net present value, and determining a value of the asset size variable that corresponds to the optimal point along the benefit curve.

In some embodiments, step 1606 includes incrementally increasing a target variable including at least one of a simple payback period or an annuity factor. Step 1606 may include optimizing the modified objective function for each value of the target variable and determining whether the new asset is purchased based on the optimal values of the asset size variables. Step 1606 may include optimizing an internal rate of return by finding a minimum value of the target variable that results in the new asset being purchased.

In some embodiments, step 1606 includes defining an internal rate of return as a function of the initial purchase cost of the new asset and the benefit of the new asset. Both the initial purchase cost and the benefit of the new asset may depend on the asset size variables. Step 1606 may include calculating the internal rate of return for a plurality of points along the benefit curve, optimizing the internal rate of return by finding an optimal point along the benefit curve that maximizes the internal rate of return, and determining a value of the asset size variable that corresponds to the optimal point along the benefit curve.

In some embodiments, step 1606 includes executing a stochastic optimization process to determine optimal values for decision variables in the modified cost function. For example, projected values of non-predetermined terms may be obtained for a plurality of scenarios, i.e., for many possible situations that may occur during an optimization period. For example, projected building loads, utility rates, IBDR/PBDR requests or schedules, and/or some other non-predetermined values may be obtained for a plurality of scenarios. The cost function can then be optimized over the plurality of scenarios, for example to select an asset size that optimizes the internal rate of return or other metric over the plurality of scenarios. In some cases, the stochastic optimization process includes performing a first optimization to determine an asset size target that minimizes a risk attribute of the cost function over the plurality of scenarios and performing a second optimization subject to a constraint defined by the asset size target over the plurality of scenarios to determine values for energy load setpoints, asset size variables, and participation in an incentive program. Optimization and asset size determination may thereby be configured to account for stochastic variation in building loads, utility rates, IBDR/PBDR requests or schedules, and/or other terms over time. The present disclosure contemplates various adaptations, implementations, modifications, etc. of the systems and methods described in U.S. patent application Ser. No. 16/115,290, filed Aug. 28, 2018 for uses with the asset sizing systems and methods described herein. The entire disclosure of U.S. patent application Ser. No. 16/115,290 is incorporated by reference herein.

Still referring to FIG. 16, process 1600 is shown to include using the optimal energy load setpoints to operate the HVAC equipment (step 1608). In some embodiments, step 1608 is performed when process 1600 is part of an online optimization routine. For example, step 1608 can be performed by any of the controllers described with reference to FIGS. 1-6 to provide setpoints to equipment. However, step 1608 may be omitted if process 1600 is performed in an offline environment. For example step 1608 may be omitted if process 1600 is performed by planning tool 702.

In some embodiments, in addition to or instead of operating the HVAC equipment at step 1608, the process 1600 includes initiating a process to acquire and install the new asset having an asset size based on the values of the asset size variables resulting from the optimization of the modified cost function. For example, in some embodiments the asset sizing module 916 generates a purchase order or other request to obtain (e.g., purchase, lease, ship, obtain, install) a recommended device of storage equipment. In some cases, a new device may be automatically ordered and delivered in response to the optimization of step 1616. In some embodiments, the asset sizing module 916 automatically notifies a technician, service representative, etc. of the optimal asset size and/or automatically schedules an appointment for ordering and/or installation of a new device. The various subplants and building equipment may be controlled to facilitate installation of the new asset, for example by shifting loads or stored resources away from devices that may need to be deactivated during an installation time.

In some embodiments, the process 1600 includes installing a new asset having the optimal asset size as determined at step 1606, configuring the new asset to communicate with and operate as controlled by the energy storage controller 506 and/or the controller 522, re-establishing the plant model to account for the new asset, and controlling the new asset and pre-existing assets (e.g., the various generator subplants 520 and storage subplants 530) in accordance with an output of one or more of the optimization processes described herein. Process 1600 may thereby result in optimal operation of an updated, higher-efficiency, cost-effective plant.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermal energy production and control system comprising:
  a heat recovery chiller operable to generate cold thermal energy by removing heat from a first fluid supply and generate hot thermal energy by adding the heat to a second fluid supply;
  thermal energy storage operable to store and discharge the hot thermal energy or the cold thermal energy generated by the heat recovery chiller; and
  a controller configured to:
    obtain thermal energy load targets comprising amounts of the hot thermal energy or the cold thermal energy required by one or more resource sinks at a plurality of time steps of a time period;

use the thermal energy load targets to generate control decisions for the heat recovery chiller and the thermal energy storage for the plurality of time steps, the control decisions comprising:

an asset size target for a new heat recovery chiller or a new thermal energy storage to be added to the thermal energy production and control system;

a first amount of the hot thermal energy or the cold thermal energy to be generated by the heat recovery chiller at a first time step of the time period and stored in the thermal energy storage;

a second amount of the hot thermal energy or the cold thermal energy to be discharged from the thermal energy storage and used to satisfy one or more of the thermal energy load targets for a second time step of the time period, the second amount of the hot thermal energy or the cold thermal energy comprising some or all of the first amount of the hot thermal energy or the cold thermal energy; and a third amount of the hot thermal energy or the cold thermal energy to be generated by the new heat recovery chiller or to be discharged from the new thermal energy storage; and operate the heat recovery chiller or the thermal energy storage in accordance with the control decisions.

2. The system of claim 1, wherein the controller is configured to:

obtain an objective function defining a control objective as a function of the control decisions for the heat recovery chiller and the thermal energy storage at the plurality of time steps;

perform an optimization of the objective function using the thermal energy load targets as constraints on the optimization to generate the control decisions for the heat recovery chiller and the thermal energy storage.

3. The system of claim 1, wherein the control decisions comprise:

an amount of the hot thermal energy for the heat recovery chiller to generate at each of the plurality of time steps;

an amount of the cold thermal energy for the heat recovery chiller to generate at each of the plurality of time steps;

an amount of the hot thermal energy to store in the thermal energy storage or discharge from the thermal energy storage at each of the plurality of time steps; and an amount of the cold thermal energy to store in the thermal energy storage or discharge from the thermal energy at each of the plurality of time steps.

4. The system of claim 1, wherein the thermal energy load targets comprise:

a hot thermal energy load time series comprising a hot thermal energy load target for each of the plurality of time steps of the time period; and a cold thermal energy load time series comprising a cold thermal energy load target for each of the plurality of time steps of the time period.

5. The system of claim 1, wherein the controller is configured to:

obtain a subplant curve or device efficiency curve that defines a relationship between an amount of the hot thermal energy generated by the heat recovery chiller and an amount of the cold thermal energy generated by the heat recovery chiller; and use the subplant curve or the device efficiency curve in combination with the thermal energy load targets to generate the control decisions for the heat recovery chiller and the thermal energy storage for the plurality of time steps.

6. The system of claim 1, wherein the asset size target indicates a storage capacity of the new thermal energy storage to be added to the thermal energy production and control system.

7. The system of claim 1, wherein the first time step and the second time step are non-consecutive time steps of the time period.

8. The system of claim 1, wherein the controller is configured to:

predict an amount of equipment degradation that will result from the control decisions for the heat recovery chiller and the thermal energy storage over the time period; and generate the control decisions based on the amount of equipment degradation.

9. The system of claim 1, wherein the control decisions comprise decisions to perform maintenance on the heat recovery chiller or the thermal energy storage at one or more time steps of the time period.

10. A method for operating a thermal energy production and control system, the method comprising:

obtaining thermal energy load targets comprising amounts of hot thermal energy or cold thermal energy required by one or more resource sinks at a plurality of time steps of a time period;

using the thermal energy load targets to generate control decisions for a heat recovery chiller and thermal energy storage for the plurality of time steps, the control decisions comprising:

an asset size target for a new heat recovery chiller or a new thermal energy storage to be added to the thermal energy production and control system;

a first amount of the hot thermal energy or the cold thermal energy to be generated by the heat recovery chiller at a first time step of the time period and stored in the thermal energy storage;

a second amount of the hot thermal energy or the cold thermal energy to be discharged from the thermal energy storage and used to satisfy one or more of the thermal energy load targets for a second time step of the time period, the second amount of the hot thermal energy or the cold thermal energy comprising some or all of the first amount of the hot thermal energy or the cold thermal energy; and a third amount of the hot thermal energy or the cold thermal energy to be generated by the new heat recovery chiller or to be discharged from the new thermal energy storage; and acquiring and installing the new heat recovery chiller or the new thermal energy storage based on the asset size target.

11. The method of claim 10, comprising:

obtaining an objective function defining a control objective as a function of the control decisions for the heat recovery chiller and the thermal energy storage at the plurality of time steps;

performing an optimization of the objective function using the thermal energy load targets as constraints on the optimization to generate the control decisions for the heat recovery chiller and the thermal energy storage.

12. The method of claim 10, wherein the control decisions comprise:
- an amount of the hot thermal energy for the heat recovery chiller to generate at each of the plurality of time steps;
- an amount of the cold thermal energy for the heat recovery chiller to generate at each of the plurality of time steps;
- an amount of the hot thermal energy to store in the thermal energy storage or discharge from the thermal energy storage at each of the plurality of time steps; and
- an amount of the cold thermal energy to store in the thermal energy storage or discharge from the thermal energy at each of the plurality of time steps.

13. The method of claim 10, wherein the thermal energy load targets comprise:
- a hot thermal energy load time series comprising a hot thermal energy load target for each of the plurality of time steps of the time period; and
- a cold thermal energy load time series comprising a cold thermal energy load target for each of the plurality of time steps of the time period.

14. The method of claim 10, comprising:
- obtaining a subplant curve or device efficiency curve that defines a relationship between an amount of the hot thermal energy generated by the heat recovery chiller and an amount of the cold thermal energy generated by the heat recovery chiller; and
- using the subplant curve or the device efficiency curve in combination with the thermal energy load targets to generate the control decisions for the heat recovery chiller and the thermal energy storage for the plurality of time steps.

15. The method of claim 10, wherein the asset size target indicates a storage capacity of the new thermal energy storage to be added to the thermal energy production and control system.

16. The method of claim 10, wherein the first time step and the second time step are non-consecutive time steps of the time period.

17. The method of claim 10, comprising:
- predicting an amount of equipment degradation that will result from the control decisions for the heat recovery chiller and the thermal energy storage over the time period; and
- generating the control decisions based on the amount of equipment degradation.

18. The method of claim 10, wherein the control decisions comprise decisions to perform maintenance on the heat recovery chiller or the thermal energy storage at one or more time steps of the time period.

19. A controller for a thermal energy production and control system, the controller comprising one or more processors and one or more non-transitory computer-readable media storing instructions that, when executed by the one or more processors, cause the one or more processors to perform operations comprising:
- obtaining an objective function defining a control objective as a function of control decisions for a heat recovery chiller and thermal energy storage at a plurality of time steps of a time period;
- obtaining thermal energy load targets comprising amounts of hot thermal energy or cold thermal energy required by one or more resource sinks at the plurality of time steps;
- performing an optimization of the objective function using the thermal energy load targets as constraints on the optimization to generate the control decisions for the heat recovery chiller and the thermal energy storage, the control decisions comprising:
  - an asset size target for a new heat recovery chiller or a new thermal energy storage to be added to the thermal energy production and control system; and
  - a first amount of the hot thermal energy or the cold thermal energy to be generated by the heat recovery chiller at a first time step of the time period and stored in the thermal energy storage;
  - a second amount of the hot thermal energy or the cold thermal energy to be discharged from the thermal energy storage and used to satisfy one or more of the thermal energy load targets for a second time step of the time period, the second amount of the hot thermal energy or the cold thermal energy comprising some or all of the first amount of the hot thermal energy or the cold thermal energy; and
  - a third amount of the hot thermal energy or the cold thermal energy to be generated by the new heat recovery chiller or to be discharged from the new thermal energy storage; and
- operating the heat recovery chiller or the thermal energy storage in accordance with the control decisions.

20. The controller of claim 19, wherein the asset size target indicates a storage capacity of the new thermal energy storage to be added to the thermal energy production and control system.

* * * * *